United States Patent
Shibayama

(10) Patent No.: US 11,965,754 B2
(45) Date of Patent: Apr. 23, 2024

(54) INFORMATION PROCESSING APPARATUS, INFORMATION PROCESSING METHOD, AND MOBILE BODY APPARATUS

(71) Applicant: SONY SEMICONDUCTOR SOLUTIONS CORPORATION, Kanagawa (JP)

(72) Inventor: Noribumi Shibayama, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 209 days.

(21) Appl. No.: 17/310,904

(22) PCT Filed: Jan. 15, 2020

(86) PCT No.: PCT/JP2020/000961
§ 371 (c)(1),
(2) Date: Aug. 30, 2021

(87) PCT Pub. No.: WO2020/183892
PCT Pub. Date: Sep. 17, 2020

(65) Prior Publication Data
US 2022/0099457 A1   Mar. 31, 2022

(30) Foreign Application Priority Data

Mar. 13, 2019   (JP) ................. 2019-046554

(51) Int. Cl.
*G01C 21/36*   (2006.01)
*B60W 50/02*   (2012.01)
(Continued)

(52) U.S. Cl.
CPC ..... *G01C 21/3841* (2020.08); *B60W 50/0205* (2013.01); *B60W 50/029* (2013.01);
(Continued)

(58) Field of Classification Search
CPC ............. G01C 21/3841; G01C 21/3881; G01C 21/32; H04W 4/46; B60W 60/0015; B60W 50/0205; B60W 50/029
See application file for complete search history.

(56) References Cited

U.S. PATENT DOCUMENTS

2019/0251743 A1   8/2019 Koyama et al.
2020/0302783 A1*  9/2020 Altendorfer ........... G08G 1/166
(Continued)

FOREIGN PATENT DOCUMENTS

CN   109906608 A   6/2019
EP   3536556 A1    9/2019
(Continued)

OTHER PUBLICATIONS

International Search Report and Written Opinion of PCT Application No. PCT/JP2020/000961, dated Apr. 7, 2020, 10 pages of ISRWO.

*Primary Examiner* — Peter D Nolan
*Assistant Examiner* — Wae L Louie
(74) *Attorney, Agent, or Firm* — CHIP LAW GROUP

(57) ABSTRACT

Provided is an information processing apparatus that creates map information on the basis of sensor information obtained by an on-vehicle sensor. The information processing apparatus includes a creation section that creates a map of a surrounding area of a mobile body on the basis of sensor information acquired by one or more sensors mounted on the mobile body, a request section that issues an information request to an external apparatus on the basis of a state of the map created by the creation section, and a merge section that merges information acquired by the request section from the external apparatus with the created map. The request section issues an information request to the external apparatus on (Continued)

the basis of a condition of a dead angle included in the map created by the creation section.

19 Claims, 11 Drawing Sheets

(51) Int. Cl.
*B60W 50/029* (2012.01)
*B60W 60/00* (2020.01)
*G01C 21/00* (2006.01)
*G01C 21/32* (2006.01)
*H04W 4/46* (2018.01)

(52) U.S. Cl.
CPC ......... *B60W 60/0015* (2020.02); *G01C 21/32* (2013.01); *G01C 21/3881* (2020.08); *H04W 4/46* (2018.02); *B60W 2050/021* (2013.01); *B60W 2050/0215* (2013.01); *B60W 2556/40* (2020.02); *B60W 2556/50* (2020.02); *B60W 2556/65* (2020.02)

(56) References Cited

U.S. PATENT DOCUMENTS

| | | | |
|---|---|---|---|
| 2021/0331666 A1* | 10/2021 | Meng | G06V 20/586 |
| 2022/0099457 A1* | 3/2022 | Shibayama | B60W 50/0205 |
| 2023/0161399 A1* | 5/2023 | Shibayama | G06F 1/329 |
| | | | 713/320 |
| 2023/0228588 A1* | 7/2023 | Lee | G01C 21/3881 |
| | | | 701/455 |
| 2023/0237689 A1* | 7/2023 | Stein | G08G 1/096775 |
| | | | 382/104 |

FOREIGN PATENT DOCUMENTS

| | | |
|---|---|---|
| JP | 2008-299676 A | 12/2008 |
| JP | 2017-157087 A | 9/2017 |
| WO | 2013/051082 A1 | 4/2013 |
| WO | 2018/083999 A1 | 5/2018 |

* cited by examiner

INFORMATION PROCESSING APPARATUS, INFORMATION PROCESSING METHOD, AND MOBILE BODY APPARATUS

CROSS REFERENCE TO RELATED APPLICATIONS

This application is a U.S. National Phase of International Patent Application No. PCT/JP2020/000961 filed on Jan. 15, 2020, which claims priority benefit of Japanese Patent Application No. JP 2019-046554 filed in the Japan Patent Office on Mar. 13, 2019. Each of the above-referenced applications is hereby incorporated herein by reference in its entirety.

TECHNICAL FIELD

A technology disclosed herein relates to an information processing apparatus, an information processing method, and a mobile body apparatus for mainly processing sensor information obtained by an on-vehicle sensor.

BACKGROUND ART

In order to implement autonomous driving or an ADAS (Advanced Driver Assistance System), it is necessary to detect a surrounding environment of an own vehicle, and various objects which are, for example, a road shape and a moving object such as a neighboring vehicle or a pedestrian in a surrounding area, and further, it is necessary to detect objects in any environment such as a rainy time and a night-time hour in addition to a daytime hour on a sunny day. For this reason, installation of many different kinds of outside recognition sensors including cameras, millimeter wave radars, and laser radars into vehicles has been started.

Further, in autonomous driving vehicles and autonomous moving robots, etc., there has been known a technology of avoiding an accident such as a collision with an obstacle by creating a local map to recognize a condition of a surrounding area on the basis of information obtained by an outside recognition sensor. The local map is also called an occupancy grid map or a grid map and indicates object existence probabilities in respective grids.

For example, there has been proposed an apparatus that creates an occupancy grid map by setting a limited area or areas, among plural areas that are defined so as to occupy a part of the occupancy grid map, so as to include a section overlapping a region disposed between a pair of road edges, to thereby suppress necessary memories and computation amounts (see PTL 1). In addition, there has been proposed a vehicle driving support system that creates a grid map in which an avoidance region where a stereoscopic object exists, an unclear region where whether a stereoscopic exists is unclear, and a safe region where no stereoscopic object exists are distinguishable from one another, and controls a steering angle to cause an own vehicle to travel (see PTL 2).

CITATION LIST

Patent Literature

[PTL 1]
  Japanese Patent Laid-Open No. 2017-157087
[PTL 2]
  WO2013/051082

SUMMARY

Technical Problem

An object of the technology disclosed herein is to provide an information processing apparatus, an information processing method, and a mobile body apparatus for creating map information on the basis of sensor information obtained by an on-vehicle sensor.

Solution to Problem

A first aspect of the technology disclosed herein is an information processing apparatus including a creation section that creates a map of a surrounding area of a mobile body on the basis of sensor information acquired by one or more sensors mounted on the mobile body, a request section that issues an information request to an external apparatus on the basis of a state of the map created by the creation section, and a merge section that merges information acquired by the request section from the external apparatus with the created map.

The request section issues an information request to the external apparatus on the basis of detection of a failure in the sensors or on the basis of a result of comparison of information regarding a current position of the mobile body with map information.

Further, the request section issues a request for map information to complement a dead angle included in the map created by the creation section or sensor information that is used to create a map to complement the dead angle, to the external apparatus.

In addition, a second aspect of the technology disclosed herein is an information processing method including a creation step of creating a map of a surrounding area of a mobile body on the basis of sensor information acquired by one or more sensors mounted on the mobile body, a request step of issuing an information request to the external apparatus on the basis of a state of the map created in the creation step, and a merging step of merging information acquired from the external apparatus in the request step with the created map.

In addition, a third aspect of the technology disclosed herein is an information processing apparatus including a creation section that creates a map of a surrounding area of a mobile body on the basis of sensor information acquired by one or more sensors mounted on the mobile body and a providing section that provides at least partial information of the map created by the creation section, in response to a request from an external apparatus.

The providing section receives the request together with position information of the external apparatus and provides information of the map to the external apparatus that exists within a predetermined range from current position information of the mobile body.

In addition, a fourth aspect of the technology disclosed herein is an information processing method including a creation step of creating a map of a surrounding area of a mobile body on the basis of sensor information acquired by one or more sensors mounted on the mobile body and a providing step of providing at least partial information of the map created by the creation section, in response to a request from an external apparatus.

In addition, a fifth aspect of the technology disclosed herein is a mobile body apparatus including a mobile body main part, one or more sensors mounted on the mobile body main part, a creation section that creates a map of a surrounding area of the mobile body on the basis of sensor information acquired by the sensors sensors, a request section that issues an information request to an external apparatus on the basis of a state of the map created by the creation section, a merge section that merges information acquired by the request section from the external apparatus with the created map, and a control section that controls driving of the mobile body main part on the basis of the map created by the creation section or on the basis of a merging result obtained by the merge section.

Advantage Effects of Invention

The technology disclosed herein can provide an information processing apparatus, an information processing method, and a mobile body apparatus that enable a dead angle included in map information that is based on own sensor information to be complemented on the basis of information transmitted from an external apparatus.

It is to be noted that the effects described herein are mere examples, and thus, effects that are provided by the technology disclosed herein are not limited thereto. In addition, the technology disclosed herein may further provide additional effects in addition to the effects described above.

Other objects, features, and advantages of the technology disclosed herein will become apparent from the detailed description based on the embodiments and the attached drawings which are described later.

DESCRIPTION OF EMBODIMENTS

Hereinafter, embodiments according to the technology disclosed herein will be explained in detail with reference to the drawings.

A. System Configuration Example

Figure 1:
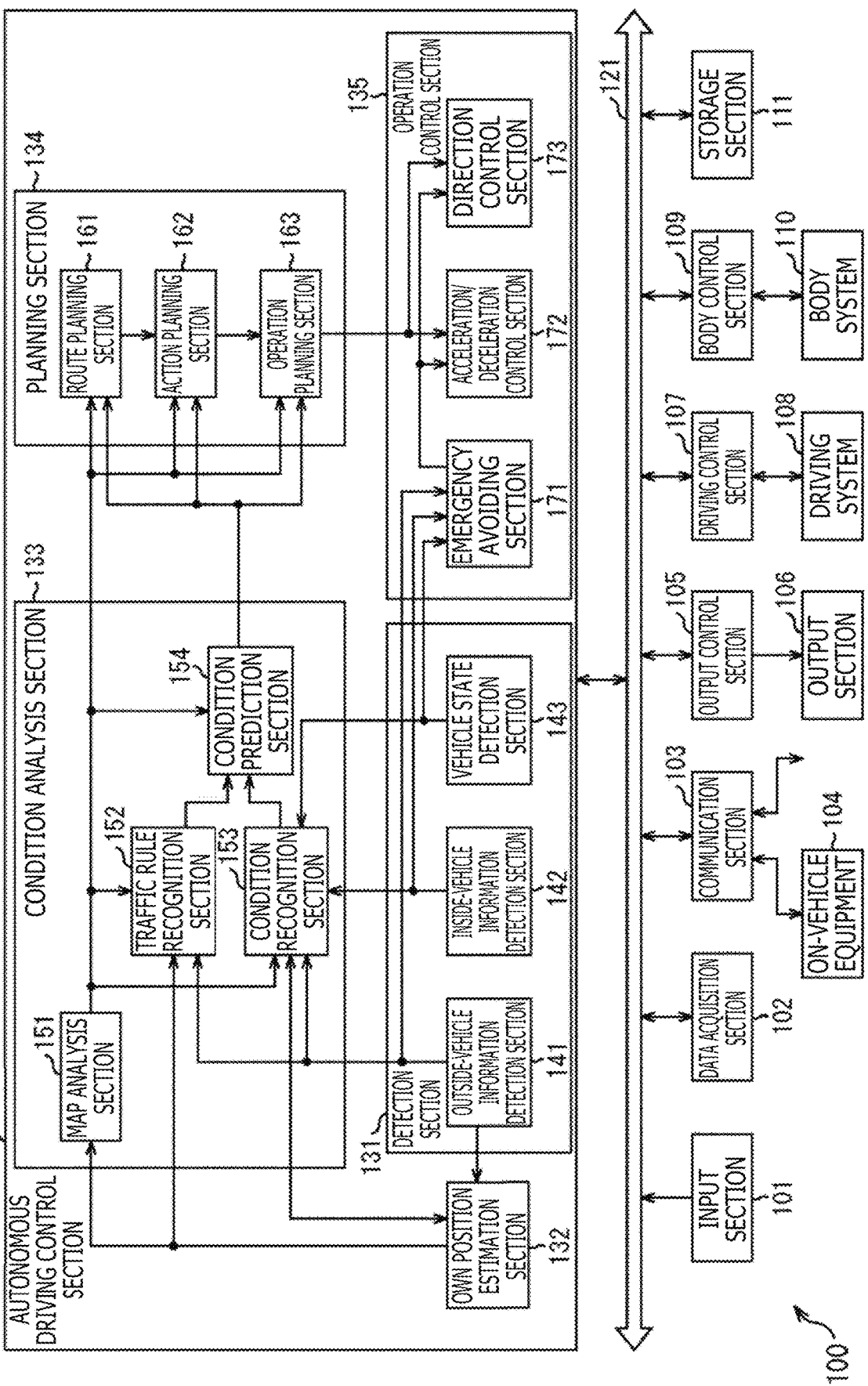
FIG. 1 is a schematic block diagram depicting a functional configuration example of a vehicle control system 100.

FIG. 1 is a schematic block diagram depicting a functional configuration example of a vehicle control system 100 which is one example of a mobile body control system to which the present technology is applicable.

It is to be noted that, hereinafter, a vehicle having the vehicle control system 100 installed therein is referred to as an own vehicle or an own vehicle, in a case where the vehicle is distinguished from other vehicles.

The vehicle control system 100 includes an input section 101, a data acquisition section 102, a communication section 103, on-vehicle equipment 104, an output control section 105, an output section 106, a driving control section 107, a driving system 108, a body control section 109, a body system 110, a storage section 111, and an autonomous driving control section 112. The input section 101, the data acquisition section 102, the communication section 103, the output control section 105, the driving control section 107, the body control section 109, the storage section 111, and the autonomous driving control section 112 are mutually connected via a communication network 121. The communication network 121 includes a bus or an on-vehicle communication network conforming to a standard such as CAN (Controller Area Network), LIN (Local Interconnect Network), LAN (Local Area Network), or FlexRay (registered trademark), for example. It is to be noted that the sections in the vehicle control system 100 may be directly connected without the communication network 121.

It is to be noted that, in a case where the sections of the vehicle control system 100 perform communication with each other via the communication network 121, the description of the communication network 121 is omitted, hereinafter. For example, in a case where the input section 101 and the autonomous driving control section 112 perform communication with each other via the communication network 121, a simple expression that the input section 101 and the autonomous driving control section 112 perform communication with each other is used.

The input section 101 includes a device that is used by an occupant to input various types of data and instructions, etc. For example, the input section 101 includes an operation device such as a touch panel, a button, a microphone, a switch, and a lever, and an operation device to which an input can be performed through a voice or a gesture by a method other than manual operations. In addition, for example, the input section 101 may be an externally connected device such as a remote controller that uses infrared rays or any other radio waves, or a mobile device or a wearable device that can handle operations of the vehicle control system 100. The input section 101 generates an input signal on the basis of data, an instruction, or the like inputted by an occupant and supplies the signal to the sections in the vehicle control system 100.

The data acquisition section 102 includes various sensors that acquire data to be used for processes in the vehicle control system 100 and supplies the acquired data to the sections in the vehicle control system 100.

For example, the data acquisition section 102 includes various sensors for detecting a state of the own vehicle, etc. Specifically, for example, the data acquisition section 102 includes a gyro sensor, an acceleration sensor, an inertial measurement unit (IMU), and sensors for detecting an operation amount of an accelerator pedal, an operation amount of a brake pedal, a steering angle of a steering wheel, an engine speed, a motor speed, a rotational speed of wheels, etc.

The data acquisition section 102 further includes various sensors for detecting information regarding an outside of the own vehicle, for example. Specifically, for example, the data acquisition section 102 includes an imaging device such as a ToF (Time Of Flight) camera, a stereo camera, a monocular camera, an infrared camera, and any other cameras. The data acquisition section 102 further includes an environmental sensor for detecting the weather or meteorological phenomena, etc. and a surrounding information detecting sensor for detecting an object in a surrounding area of the own vehicle, for example. The environmental sensor includes a raindrop sensor, a fog sensor, a sunshine sensor, or a snow sensor, for example. The surrounding information detecting sensor includes an ultrasonic sensor, a radar, a LiDAR (Light Detection and Ranging, Laser Imaging Detection and Ranging) sensor, or a sonar, for example.

The data acquisition section 102 further includes various sensors for detecting a current position of the own vehicle, for example. Specifically, for example, the data acquisition section 102 includes a GNSS receiver that receives GNSS signals from a GNSS (Global Navigation Satellite System).

The data acquisition section 102 further includes various sensors for detecting information regarding an inside of the vehicle, for example. Specifically, for example, the data acquisition section 102 includes an imaging device that captures an image of a driver, a biosensor that detects biological information regarding the driver, and a microphone that collects sounds in the inside of the vehicle. The biosensor is provided on a seat surface or a steering wheel, for example, and detects biological information regarding an occupant sitting on the seat or the driver holding the steering wheel.

By communicating with the on-vehicle equipment 104, various external apparatuses, a server, a base station, etc., the communication section 103 transmits data supplied from the sections in the vehicle control system 100 or supplies received data to the sections in the vehicle control system 100. It is to be noted that a communication protocol supported by the communication section 103 is not limited to a particular type, and further, the communication section 103 can support plural kinds of communication protocols.

For example, the communication section 103 wirelessly communicates with the on-vehicle equipment 104 through a wireless LAN, Bluetooth (registered trademark), NFC (Near Field Communication), or WUSB (Wireless USB). Also, the communication section 103 performs wired communication with the on-vehicle equipment 104 via a connection terminal (and a cable, if needed), which is not illustrated, through a USB (Universal Serial Bus), an HDMI (High-Definition Multimedia Interface), or an MHL (Mobile High-definition Link), for example.

Further, the communication section 103 communicates with an apparatus (e.g., an application server or a control server) that exists in an external network (e.g., the Internet, a cloud network, or a network unique to a certain company) via a base station or an access point, for example. Moreover, for example, by using a P2P (Peer To Peer) technology, the communication section 103 communicates with a terminal (e.g., a pedestrian's or shop terminal, an MTC (Machine Type Communication) terminal) that exists around the own vehicle. In addition, for example, the communication section 103 performs V2X communication such as vehicle-to-vehicle communication, vehicle-to-infrastructure communication, vehicle-to-home communication, and vehicle-to-pedestrian communication. Furthermore, for example, the communication section 103 includes a beacon receiver to receive radio waves or electromagnetic waves emitted from a radio station or the like installed on a road such that information regarding the current position, traffic congestion, traffic regulations, a required time, or the like is acquired.

The on-vehicle equipment 104 includes an occupant's mobile device, an occupant's wearable device, an information device that is carried into or installed into the own vehicle, a navigator that conducts a route search to get a desired destination, etc., for example.

The output control section 105 controls various information outputs to an occupant in the own vehicle or to the outside of the own vehicle. For example, the output control section 105 controls a visual information (e.g., image data) output and an auditory information (e.g., sound data) output from the output section 106 by generating an output signal including at least one of visual information and auditory information and supplying the output signal to the output section 106. Specifically, for example, the output control section 105 generates a bird's eye view image or a panoramic image by merging image data captured by different imaging devices in the data acquisition section 102, and supplies an output signal including the generated image to the output section 106. Also, for example, the output control section 105 generates sound data including an alarm sound or an alarm message about a risk such as a collision, a contact, an entry into a dangerous area, and supplies an output signal including the generated sound data to the output section 106.

The output section 106 includes a device that is capable of outputting visual information or auditory information to an occupant in the own vehicle or to the outside of the own vehicle. The output section 106 includes a display device, an instrument panel, an audio speaker, headphones, a wearable device such as a glass-type display that is worn by an occupant, a projector, and a lamp, for example. The display device included in the output section 106 may be a device equipped with a normal display, or may be a device such as a head-up display, a transmission type display, or a device having an AR (Augmented Reality) display function, that is, a device that displays visual information within the driver's visual field.

The driving control section 107 controls the driving system 108 by generating various control signals and supplying the signals to the driving system 108. In addition, the driving control section 107 reports a controlled state of the driving system 108 by supplying control signals to the sections other than the driving system 108, if needed, for example.

The driving system 108 includes various devices that are involved in driving of the own vehicle. For example, the driving system 108 includes a driving force generating device for generating a driving force for an internal combustion engine or a drive motor, a driving force transmitting device for transmitting a driving force to wheels, a steering mechanism for adjusting the steering angle, a braking device for generating a braking force, an ABS (Antilock Brake System), an ESC (Electronic Stability Control), an electric power steering device, etc.

The body control section 109 controls the body system 110 by generating various control signals and supplying the signals to the body system 110. In addition, the body control section 109 reports a controlled state of the body system 110 by suppling control signals to the sections other than the body system 110, if needed, for example.

The body system 110 includes various body devices mounted on the vehicle body. For example, the body system 110 includes a keyless entry system, a smart key system, a power window device, power seats, a steering wheel, an air conditioner, various lamps (e.g., head lamps, back lamps, brake lamps, blinkers, fog lamps, etc.), etc.

The storage section 111 includes a magneto-optical storage device, an optical storage device, a semiconductor storage device, and a magnetic storage device such as a ROM (Read Only Memory), a RAM (Random Access Memory), and an HDD (Hard Disc Drive), for example. The storage section 111 stores various programs, data, etc. which are used at the sections in the vehicle control system 100. For example, the storage section 111 stores map data regarding a 3D high accuracy map such as a dynamic map, a global map which has lower accuracy than a high accuracy map but covers a wider area, a local map including information regarding the surrounding area of the own vehicle, etc.

The autonomous driving control section 112 performs control for autonomous driving which is autonomous travel, driving support, or the like. Specifically, the autonomous driving control section 112 performs cooperation control in order to implement ADAS (Advanced Driver Assistance System) functions including a function of avoiding the own vehicle from a collision or relaxing a shock of the own vehicle, a function of performing following travel based on an inter-vehicle distance, a function of traveling at a fixed speed, a function of issuing an alarm about a collision of the own vehicle, or a function of issuing an alarm to report a departure of the own vehicle from a lane, for example. In addition, the autonomous driving control section 112 performs cooperation control in order to implement autonomous driving in which autonomous travel which is not based on a driver's operation is performed, for example. The autonomous driving control section 112 includes a detection section 131, an own position estimation section 132, a condition analysis section 133, a planning section 134, and an operation control section 135.

The detection section 131 detects various types of information necessary to control autonomous driving. The detection section 131 includes an outside-vehicle information detection section 141, an inside-vehicle information detection section 142, and a vehicle state detection section 143.

The outside-vehicle information detection section 141 detects information regarding the outside of the own vehicle on the basis of data or signals supplied from the sections in the vehicle control system 100. For example, the outside-vehicle information detection section 141 detects, recognizes, and tracks an object existing in the surrounding area of the own vehicle, and also, detects a distance to the object. Examples of an object to be detected include a vehicle, a person, an obstacle, a structure, a road, a traffic signal, a traffic sign, and a road sign. Further, for example, the outside-vehicle information detection section 141 detects a surrounding environment of the own vehicle. Examples of a surrounding environment to be detected include weather, temperature, humidity, brightness, and a state of a road surface. The outside-vehicle information detection section 141 supplies data indicating the detection result to the own position estimation section 132, a map analysis section 151, a traffic rule recognition section 152, and a condition recognition section 153 of the condition analysis section 133, and an emergency avoiding section 171 of the operation control section 135, etc.

The inside-vehicle information detection section 142 detects information regarding the inside of the vehicle on the basis of data or signals supplied from the sections in the vehicle control system 100. For example, the inside-vehicle information detection section 142 authenticates and recognizes a driver, detects a state of the driver, detects an occupant, and detects the environment in the inside of the vehicle. Examples of the state of the driver to be detected include a physical condition, an awaking degree, a degree of concentration, a degree of fatigue, and a direction of a visual line. Examples of the environment in the inside of the vehicle to be detected include temperature, humidity, brightness, and an odor. The inside-vehicle information detection section 142 supplies data indicating the detection result to the condition recognition section 153 of the condition analysis section 133, the emergency avoiding section 171 of the operation control section 135, etc.

The vehicle state detection section 143 detects the state of the own vehicle on the basis of data or signals supplied from the sections in the vehicle control system 100. Examples of the state of the own vehicle to be detected include a speed, an acceleration, a steering angle, presence/absence of an abnormality, what the abnormality is, a state of a driving operation, a position and inclination of a power seat, a state of a door lock, and a state of any other on-vehicle equipment. The vehicle state detection section 143 supplies data indicating the detection result to the condition recognition section 153 of the condition analysis section 133, the emergency avoiding section 171 of the operation control section 135, etc.

The own position estimation section 132 estimates a position and an attitude of the own vehicle on the basis of data or signals supplied from the sections in the vehicle control system 100, such as the outside-vehicle information detection section 141 and the condition recognition section 153 of the condition analysis section 133. In addition, the own position estimation section 132 generates a local map (hereinafter, referred to as an own position estimation map) that is used to estimate the position of the own vehicle, if needed. For example, a high-accuracy map using an SLAM (Simultaneous Localization and Mapping) technology or the like is used as the own position estimation map. The own position estimation section 132 supplies data indicating the estimation result to the map analysis section 151, the traffic rule recognition section 152, and the condition recognition section 153 of the condition analysis section 133, etc. In addition, the own position estimation section 132 causes the storage section 111 to store the own position estimation map.

The condition analysis section 133 executes analysis of a condition of the own vehicle and a condition of the surrounding area. The condition analysis section 133 includes the map analysis section 151, the traffic rule recognition section 152, the condition recognition section 153, and a condition prediction section 154.

The map analysis section 151 constructs a map including information necessary for autonomous driving processes, by analyzing various maps stored in the storage section 111 while using data or signals supplied from the sections in the vehicle control system 100 such as the own position estimation section 132 and the outside-vehicle information detection section 141, if needed. The map analysis section 151 supplies the constructed map to the traffic rule recognition section 152, the condition recognition section 153, the condition prediction section 154, and also to a route planning section 161, an action planning section 162, and an operation planning section 163 of the planning section 134, etc.

The traffic rule recognition section 152 recognizes a traffic rule in the surrounding area of the own vehicle on the basis of data or signals supplied from the sections in the vehicle control system 100 such as the own position estimation section 132, the outside-vehicle information detection section 141, and the map analysis section 151. As a result of this recognition, a position and a state of a traffic signal in the surrounding area of the own vehicle, details of a traffic rule in the surrounding area of the own vehicle, and a lane in which the own vehicle can travel, for example, are recognized. The traffic rule recognition section 152 supplies data indicating the recognition result to the condition prediction section 154, etc.

The condition recognition section 153 recognizes conditions concerning the own vehicle on the basis of data or signals supplied from the sections in the vehicle control system 100, such as the own position estimation section 132, the outside-vehicle information detection section 141, the inside-vehicle information detection section 142, the vehicle state detection section 143, and the map analysis section 151. For example, the condition recognition section 153 recognizes the condition of the own vehicle, the condition of the surrounding area of the own vehicle, and a condition of the driver of the own vehicle, etc. In addition, the condition recognition section 153 generates a local map (hereinafter, referred to as a condition recognition map) which is used to recognize the condition of the surrounding area of the own vehicle, if needed. For example, an occupancy grid map is used as the condition recognition map.

Examples of the condition of the own vehicle to be recognized include the position, attitude, and motion (e.g., the speed, the acceleration, and a movement direction) of the own vehicle, and the presence/absence of an abnormality and what is the abnormality. Examples of the condition of the surrounding area of the own vehicle to be recognized include a type and a position of a static object in the surrounding area, a type, a position, and a motion (e.g., the speed, the acceleration, and the movement direction) of a moving object in the surrounding area, a configuration of a road in the surrounding area and the state of the road surface, and weather, temperature, humidity, and brightness in the surrounding area. Examples of the state of the driver to be recognized include the physical condition, the awaking degree, the degree of concentration, the degree of fatigue, the direction of the visual line, and a driving operation.

The condition recognition section 153 supplies data (including the condition recognition map, if needed) indicating the recognition result to the own position estimation section 132, the condition prediction section 154, etc. In addition, the condition recognition section 153 causes the storage section 111 to store the condition recognition map.

The condition prediction section 154 predicts conditions concerning the own vehicle on the basis of data or signals supplied from the sections in the vehicle control system 100 such as the map analysis section 151, the traffic rule recognition section 152, and the condition recognition section 153. For example, the condition prediction section 154 predicts the condition of the own vehicle, the condition of the surrounding area of the own vehicle, the condition of the driver, etc.

Examples of the condition of the own vehicle to be predicted include a behavior of the own vehicle, occurrence of an abnormality in the own vehicle, and a travelable distance of the own vehicle. Examples of the condition of the surrounding area of the own vehicle to be predicted include a behavior of a moving object, a traffic signal state change, and an environmental change such as a weather change in the surrounding area of the own vehicle. Examples of the condition of the driver to be predicted include a behavior of the driver and the physical condition of the driver.

The condition prediction section 154 supplies data indicating the prediction result and the data supplied from the traffic rule recognition section 152 and the condition recognition section 153, to the route planning section 161, the action planning section 162, and the operation planning section 163 of the planning section 134, etc.

The route planning section 161 plans a route to a destination on the basis of data or signals supplied from the sections in the vehicle control system 100 such as the map analysis section 151 and the condition prediction section 154. For example, the route planning section 161 defines a route from the current position to a designated destination on the basis of the global map. In addition, for example, the route planning section 161 changes the route, as appropriate, on the basis of conditions of traffic congestion, an accident, a traffic rule, and construction, the physical condition of the driver, and the like. The route planning section 161 supplies data indicating the planned route to the action planning section 162, etc.

The action planning section 162 plans an own vehicle's action for conducting safe travel along the route planned by the route planning section 161 within a planned time period, on the basis of data or signals supplied from the sections in the vehicle control system 100 such as the map analysis section 151 and the condition prediction section 154. For example, the action planning section 162 plans making a start and a stop, a travel direction (e.g., forward movement, rearward movement, left turn, right turn, direction change), a travel lane, a travel speed, and passing. The action planning section 162 supplies data indicating the planned own vehicle's action to the operation planning section 163, etc.

The operation planning section 163 plans an own vehicle's operation for carrying out the action planned by the action planning section 162 on the basis of data or signals supplied from the sections in the vehicle control system 100 such as the map analysis section 151 and the condition prediction section 154. For example, the operation planning section 163 plans an acceleration, a deceleration, and a travel track. The operation planning section 163 supplies data indicating the planned own vehicle's operation to an acceleration/deceleration control section 172 and a direction control section 173 of the operation control section 135, etc.

The operation control section 135 controls an operation of the own vehicle. The operation control section 135 includes the emergency avoiding section 171, the acceleration/deceleration control section 172, and the direction control section 173.

The emergency avoiding section 171 detects an emergency such as a collision, a contact, an entry into a dangerous area, a driver abnormality, and a vehicle abnormality on the basis of the detection results obtained by the outside-vehicle information detection section 141, the inside-vehicle information detection section 142, and the vehicle state detection section 143. In a case where occurrence of an emergency is detected, the emergency avoiding section 171 plans an own vehicle's operation to avoid the emergency. This operation is a sudden stop, a sudden turn, or the like. The emergency avoiding section 171 supplies data indicating the planned own vehicle's operation to the acceleration/deceleration control section 172 and the direction control section 173, etc.

The acceleration/deceleration control section 172 performs acceleration/deceleration control for implementing the own vehicle's operation planned by the operation planning section 163 or the emergency avoiding section 171. For example, the acceleration/deceleration control section 172 calculates a control target value of the driving force generation device or the brake device for implementing the planned acceleration, deceleration, or sudden stop, and supplies a control command indicating the calculated control target value to the driving control section 107.

The direction control section 173 performs direction control to implement the own vehicle's operation planned by the operation planning section 163 or the emergency avoiding section 171. For example, the direction control section 173 calculates a control target value of the steering mechanism to implement the travel track or the sudden turn planned by the operation planning section 163 or the emergency avoiding section 171, and supplies a control command indicating the calculated control target value to the driving control section 107.

B. Troubles in Autonomous Driving/ADAS

In order to implement autonomous driving or ADAS, the vehicle control system 100 depicted in FIG. 1 is configured to, while acquiring the surrounding environment (e.g., information regarding the shape of a road, a neighboring vehicle, a pedestrian, etc.) of the own vehicle on the basis of sensor information obtained by plural outside recognition sensors such as cameras, radars, and LiDAR, automatically make a determination regarding traveling of the own vehicle and perform control therefor according to the surrounding environment. Specifically, the condition recognition section 153 creates a condition recognition map which is a grid map or the like, so that autonomous driving or ADAS is implemented while lane deviation is not involved irrespective of the shape of the road, and further, a collision with various objects including a neighboring vehicle and a pedestrian is avoided.

However, when one or some of the plural outside recognition sensors fail to acquire precise sensor information due to a fault or any other causes, an incomplete condition recognition map is created. As a result, it is difficult to implement autonomous driving or ADAS.

For example, in a case where minimum required on-vehicle sensors cease operating during autonomous driving of a vehicle, the autonomous driving cannot be normally continued. Without sensor information, even a safe evacuation to a road shoulder is difficult. In such a case, due to a failure or malfunction in one or some of the on-vehicles sensors, the vehicle control system 100 cannot create a precise and sufficient condition recognition map.

Figure 2:
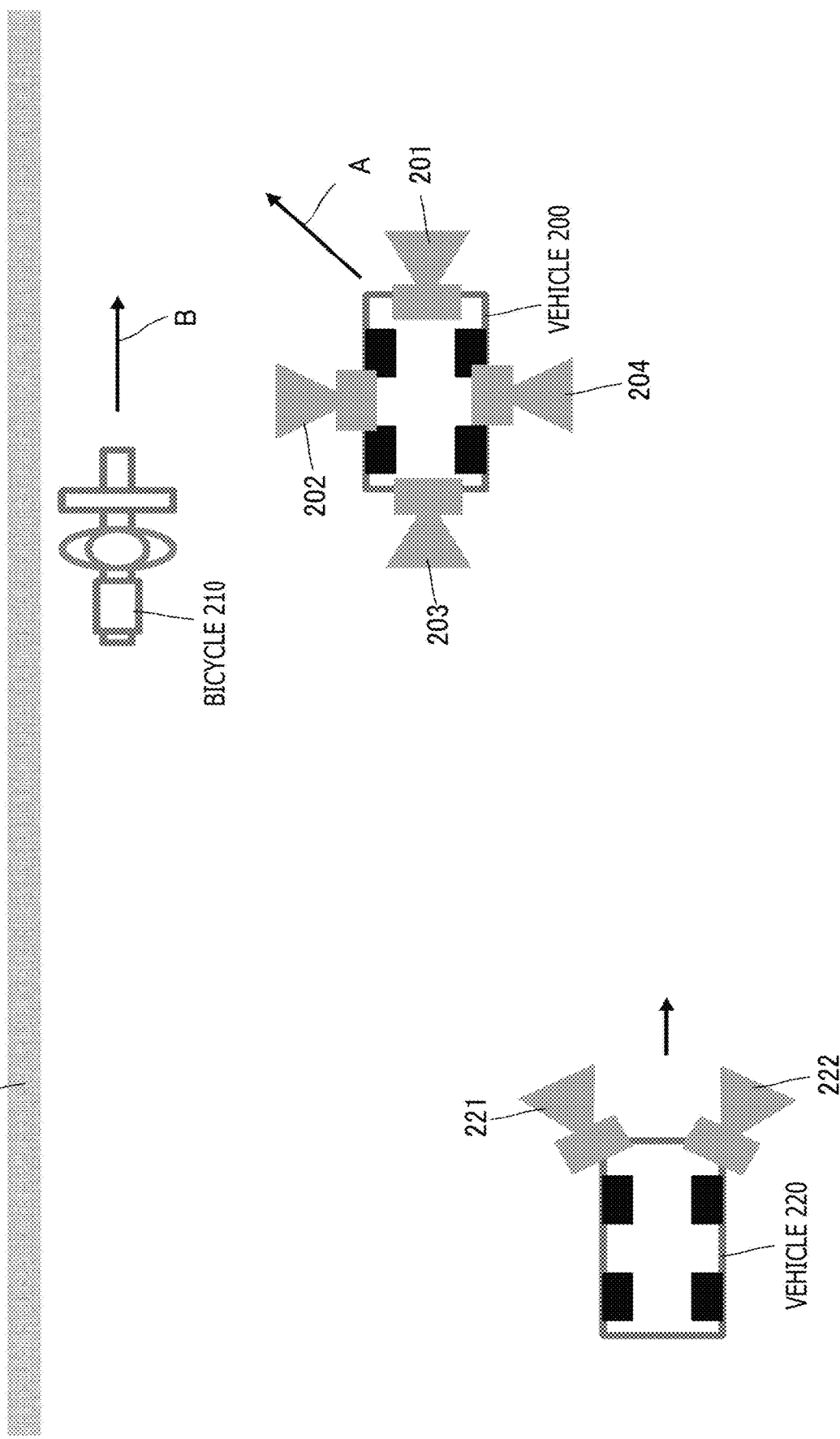
FIG. 2 is a diagram depicting an example in which a failure occurs in one or some of on-vehicle sensors of a vehicle in autonomous driving.

FIG. 2 depicts an example in which a failure has occurred in one or some of on-vehicle sensors of a vehicle in autonomous driving. In the figure, three cameras 201 to 204 respectively photographing the front, rear, left, and right sides are mounted on a vehicle 200. It is assumed that a failure has occurred in the camera 202 photographing the left side during autonomous driving, so that the camera 202 completely ceases to function. In this case, the left side becomes a dead angle for the vehicle 200. Even when the vehicle 200 evacuates to a road shoulder by traveling to a direction indicated by arrow A, safety cannot be ensured. For example, when a bicycle 210 on a road shoulder on the left side of the vehicle 200 is traveling in a direction indicated by arrow B, the bicycle 210 is within a dead angle for the vehicle 200. If the vehicle 200 evacuates to the road shoulder without safety ensured, a collision accident with the bicycle 210 is likely to occur.

Moreover, even when all the required on-vehicle sensors are normally operating, there is a concern that sufficient safety cannot be ensured in a dead angle because the visual field is narrowed by a surrounding wall or the like. That is, the vehicle control system 100 cannot create a precise and sufficient condition recognition map due to the surrounding environment.

Figure 3:
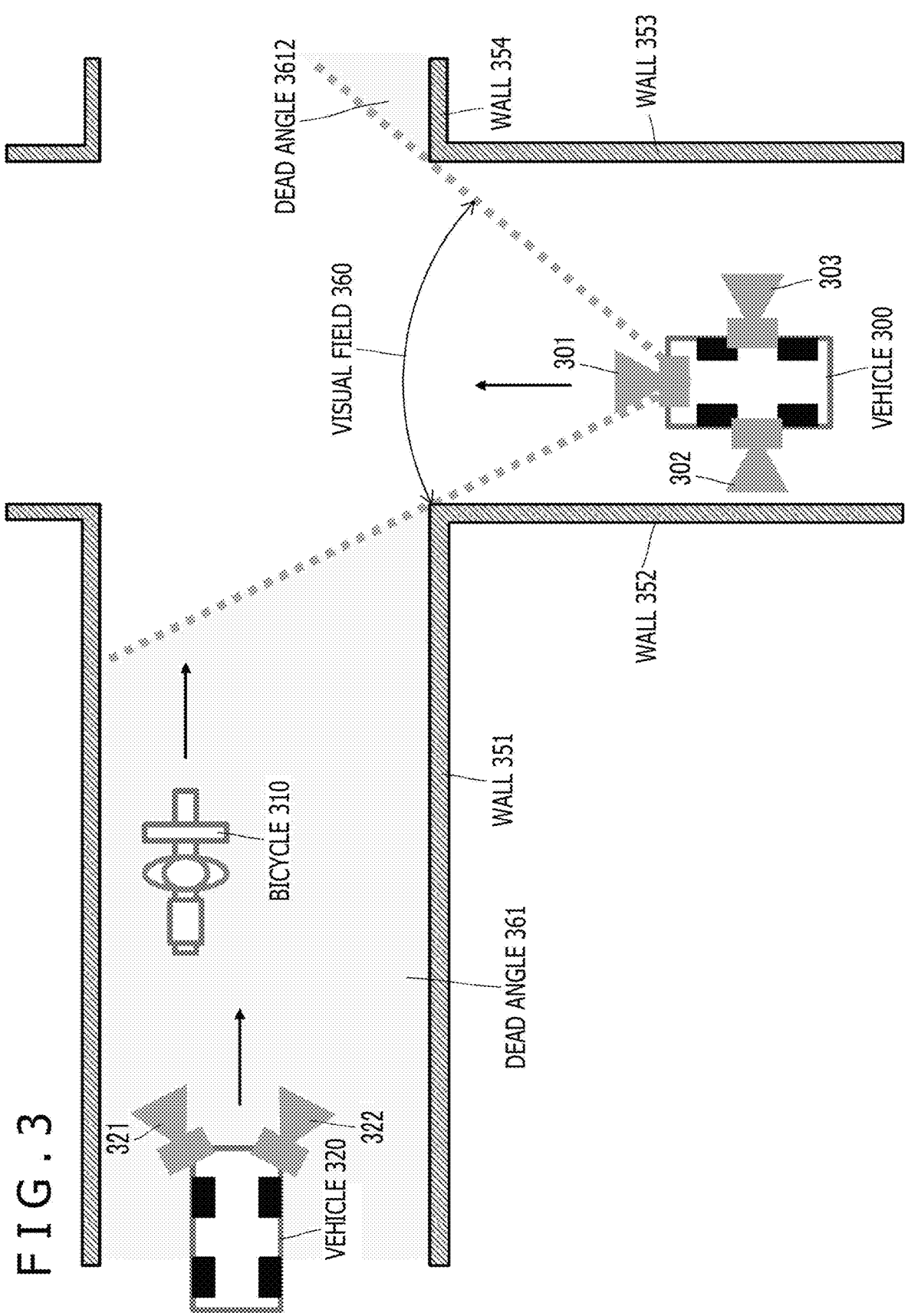
FIG. 3 is a diagram depicting a situation in which a visual field of a vehicle in autonomous driving is narrowed by walls in a surrounding area.

FIG. 3 depicts a situation in which the visual field of a vehicle in autonomous driving is narrowed by walls in the surrounding area. In the figure, three cameras 301 to 303 respectively photographing the front, left, and right sides are mounted on a vehicle 300. However, around a crossroad intersection, visual fields of the cameras 301 to 303 are blocked by surrounding walls 351 to 354, so that the visual field is narrowed, in a left-right direction, to a range denoted by reference numeral 360. Accordingly, although the cameras 301 to 303 are all normally operating, a dead angle 361 and a dead angle 362 are generated on the left front side and the right front side of the vehicle 300.

In the example depicted in FIG. 3, a bicycle 310 and another vehicle 320 traveling toward the intersection from the left side suddenly appear from the dead angle 361 into the visual field, immediately before the vehicle 300 enters the intersection. If the vehicle 300 having reached near such crossroads continues autonomous driving while the vehicle speed is kept, there is a risk of a collision with the bicycle 310 or the other vehicle 320. In other words, in order to prevent such a collision accident, at least one of the vehicles 300 and 320 needs to sufficiently reduce the speed.

C. Complement Information for Autonomous Driving/ADAS

A technology, which is suggested by the present description, for, even in a case where a dead angle is generated due to a failure in at least one or some of outside recognition sensors or a surrounding environment (e.g., a place near an intersection) of a vehicle, allowing the vehicle control system 100 to conduct an evacuation to a road shoulder or the like by using information obtained from the outside, in order to prevent accidents or continue safe driving, is as follows. According to the technology suggested by the present description, the vehicle control system 100 can implement autonomous driving or ADAS in a suitable manner by removing the troubles which have been explained with reference to FIGS. 2 and 3.

In the present embodiment, the vehicle control system 100 acquires, from the outside of the own vehicle, information necessary to prevent an accident or continue safe driving. Specifically, the information is regarding a region that becomes a dead angle in the condition recognition map due to a failure in the outside recognition sensors or the surrounding environment, etc. (or may be sensor information necessary to generate map information regarding the dead angle region).

In addition, the vehicle control system 100 is assumed to be basically able to acquire information necessary to prevent an accident or continue safe driving through V2X communication. Examples of the V2X communication include vehicle-to-vehicle (V2V) communication, vehicle-to-infrastructure (V2I) communication, vehicle-to-home (V2H) communication, and vehicle-to-pedestrian (V2P) communication (as previously described).

For convenience, the following explanation is mainly about an embodiment in which the vehicle control system 100 acquires, by using V2V communication, necessary information from a neighboring vehicle that is travelling in the surrounding area (within a predetermined range) of the own vehicle. However, the vehicle control system 100 may acquire, by using V2X communication other than V2V, necessary information from a digital camera being carried by a pedestrian, or from a monitoring camera or a fixed point camera installed at a place next to a road on which the own vehicle is traveling.

C-1. Process when Failure has Occurred in On-Vehicle Sensor

This chapter gives an explanation about a process procedure in which a vehicle that cannot continue autonomous driving because a failure has occurred in one or some of on-vehicle sensors on the vehicle evacuates to a road shoulder with safety ensured on the basis of information acquired from a neighboring vehicle.

When a failure occurs in the camera 202 photographing the left side and the camera 202 completely ceases to function during autonomous driving, the vehicle 200 needs to evacuate to a road shoulder, as depicted in FIG. 2. However, since the bicycle 210 is traveling in the region that has become a dead angle due to the failure in the camera 202, the vehicle 200 needs to avoid a collision with the bicycle 210 when moving toward the road shoulder.

Hereinafter, it is assumed that the vehicle 200 evacuates to the road shoulder while ensuring safety on the basis of information acquired from the neighboring vehicle 220. On-vehicle cameras 221 and 222 of the neighboring vehicle 220 are respectively photographing the left front side and the right front side of the vehicle 220. Information for complementing the dead angle for the vehicle 200 can be acquired on the basis of images captured by the on-vehicle cameras 221 and 222.

Figure 4:
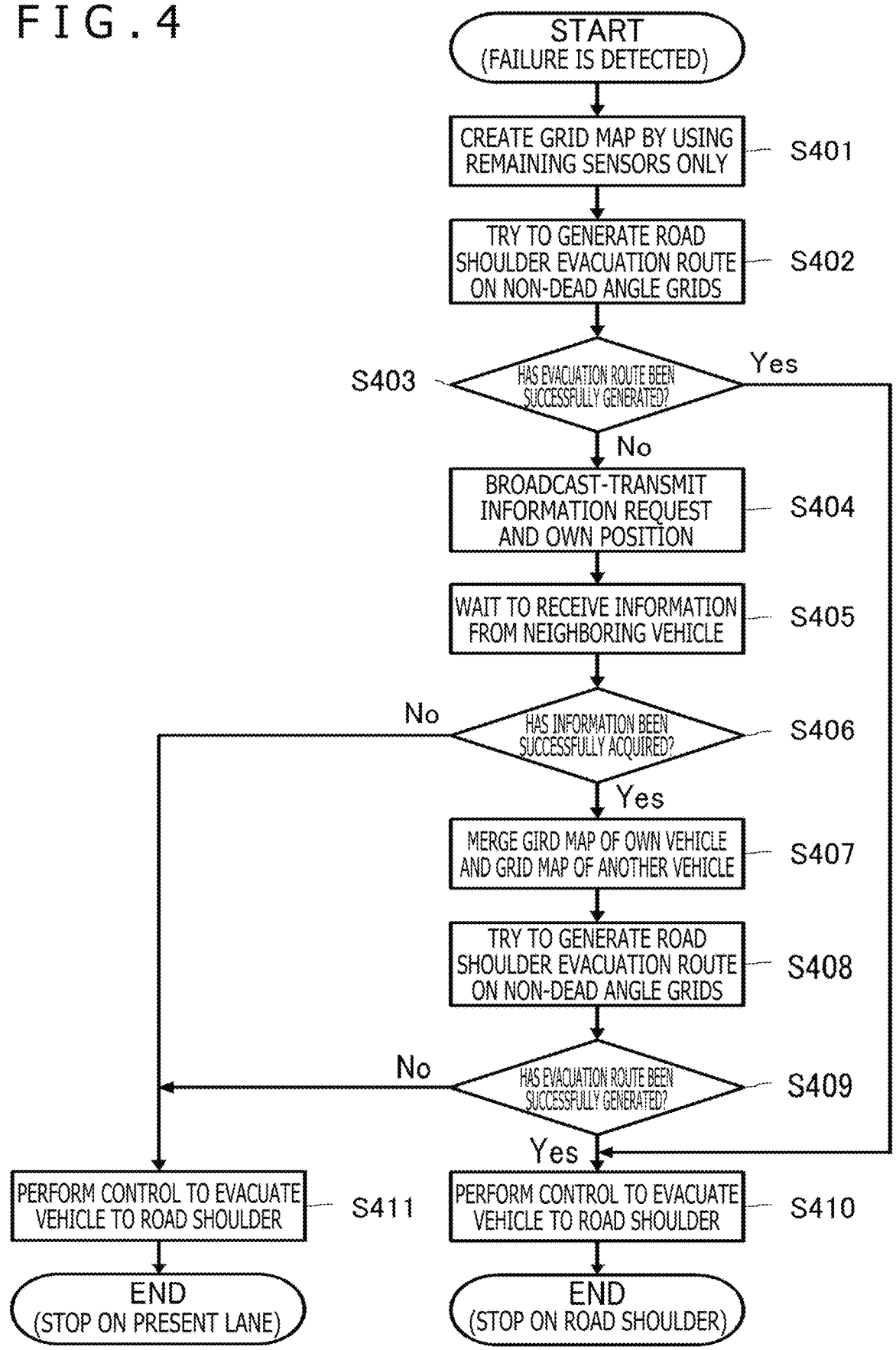
FIG. 4 is a flowchart depicting a process procedure for ensuring safety of a vehicle having on-vehicle sensors in one or some of which a failure has occurred.

FIG. 4 depicts a flowchart of a process procedure for ensuring safety for a vehicle in which a failure has occurred in one or some of on-vehicle sensors. For example, in the vehicle control system 100 controlling autonomous driving of the vehicle 200 in FIG. 2, this process procedure is started when a failure is detected in any of the plural outside recognition sensors such as cameras, radars, or LiDAR included in the data acquisition section 102, and is executed at the autonomous driving control section 112.

First, the condition recognition section 153 tries to create a condition recognition map by using only sensor information supplied from the remaining sensors that have no failure, among the on-vehicle sensors included in the data acquisition section 102 (step S401).

Here, it is assumed that a grid map in which object existence probabilities in respective grids are indicated is created as the condition recognition map. The condition recognition map including a dead angle region is created because sensor information cannot be obtained from the failed sensor. Hereinafter, grids in a region that has become a dead angle due to a failure or the like in a sensor are referred to as "dead angle grids," and the remaining grids are referred to as "non-dead angle grids." In the example depicted in FIG. 2, dead angle grids are expected to be generated on the left side of the vehicle 200.

The condition prediction section 154 predicts the condition of the surrounding area of the own vehicle, etc. on the basis of the grid map created by the condition recognition section 153. Here, the condition prediction section 154 predicts the condition of the surrounding area of the own vehicle on the basis of non-dead angle grids in the grid map. Further, in the planning section 134, the route planning section 161 tries to generate, on the non-dead angle grids, a route for evacuating the own vehicle to the road shoulder, on the basis of the prediction result obtained by the condition prediction section 154, etc. (step S402).

Here, in a case where generation of a route for evacuating the own vehicle to the road shoulder on the non-dead angle grids (that is, while avoiding the dead angles) fails (No in step S403), the autonomous driving control section 112 broadcast-transmits a request for information to complement the dead angle grids, via the communication section 103 (step S404).

This information request includes information regarding the current position of the own vehicle detected on the basis of a GNSS signal received by the data acquisition section 102. In addition, the communication section 103 broadcast-transmits the information request to neighboring vehicles by basically using V2V communication, but may transmit the information request also to devices (e.g., a pedestrian's terminal, a monitoring camera, and a fixed point camera in the surrounding area of the own vehicle, etc.), which are not vehicles, by using V2X communication other than V2V. In addition, as the information to complement the dead angle grids, a grid map created in a neighboring vehicle is returned from the neighboring vehicle.

After transmitting the information request, the autonomous driving control section 112 waits to receive information from a neighboring vehicle for a predetermined time period (e.g., three seconds) (step S405).

Then, in a case where information to complement the dead angle grids is successfully received from a neighboring vehicle within the predetermined time period (Yes in step S406), the condition recognition section 153 merges the grid map created in step S401 on the basis of the information obtained from the sensors of the own vehicle and the grid map received from the neighboring vehicle (step S407). As a result of this merging, the dead angle grids in the grid map of the own vehicle are expected to be complemented, or contraction of the dead angle grids and expansion of the non-dead angle grids are expected.

It is to be noted that, in a case where a failure is detected in any of the outside recognition sensors but a proportion of the dead angle grids in the grid map created in step S401 is not greater than a predetermined value, it is not necessary to generate a route for evacuating the vehicle to the road shoulder (No in step S403). Then, the subsequent steps S404 to S407 may be skipped, and the information request to neighboring vehicles may be stopped. The reason for this is that gathering information from neighboring vehicles is not necessarily repeated as long as the vehicle has obtained a grid map substantially including no dead angle.

Thereafter, the route planning section 161 in the planning section 134 retries to generate a route for evacuating the own vehicle to the road shoulder on the non-dead angle grids in the obtained grid map (step S408).

In a case where a route for evacuating the own vehicle to the road shoulder on the non-dead angle grids has been successfully generated with use of the grid map created in the own vehicle (Yes in step S403), and in a case where a route for evacuating the own vehicle to the road shoulder has been successfully generated on the non-dead angle grids obtained by merging the grid map of the own vehicle and the grid map of the neighboring vehicle (Yes in step S409), the operation control section 135 performs vehicle control to evacuate the own vehicle to the road shoulder according to the route (step S410), and a state where the own vehicle is stopped in the road shoulder is achieved. Then, the present process is terminated.

On the other hand, in a case where the grid map of the own vehicle and the grid map of the neighboring vehicle are merged but generation of a route for evacuating the own vehicle to the road shoulder on the non-dead angle grids fails (No in step S409), or in a case where information to complement the dead angle grids from the neighboring vehicle is not received within the predetermined time period (No in step S406), evacuating the own vehicle to the road shoulder while ensuring safety is abandoned. In this case, the acceleration/deceleration control section 172 in the operation control section 135 controls the driving system 108 to gradually reduce the vehicle speed to zero (step S411), and a state where the own vehicle is stopped in the present lane is achieved. Then, the present process is terminated.

A supplementary explanation will be given of step S411. A vehicle in which a failure has occurred in one or some of on-vehicle sensors thereof cannot obtain any effective information to complement dead angles from neighboring vehicles. Thus, such a vehicle abandons safe evacuation to a road shoulder and stops in the present lane. Here, the situation in which no information is obtained from neighboring vehicles is interpreted as a situation in which there is few vehicles in the surrounding area. Therefore, even when the vehicle stops in the present lane, it is considered that the risk of being run into from behind is low.

Figure 5:
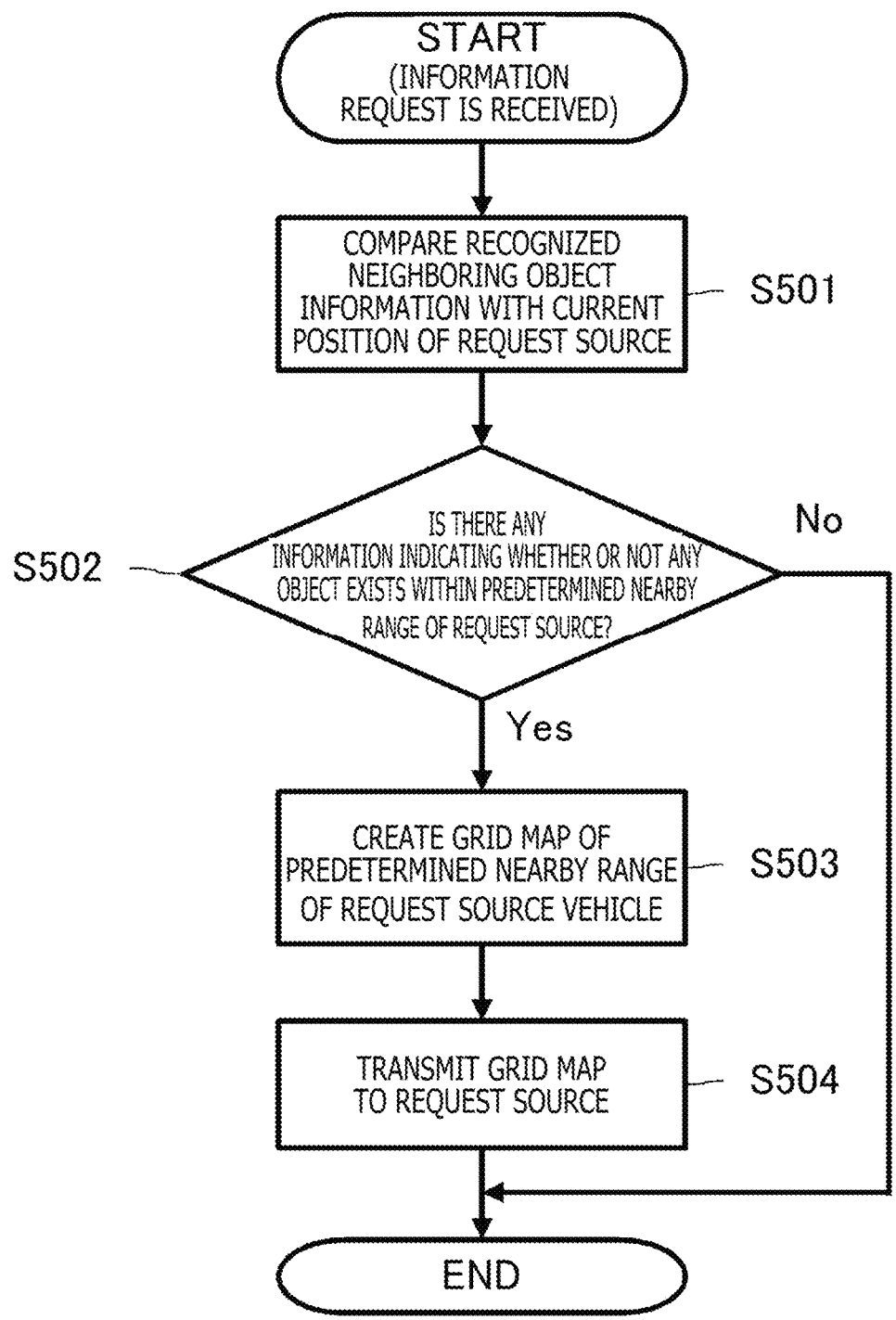
FIG. 5 is a flowchart depicting a process procedure for providing information from a vehicle in response to a request from a neighboring vehicle.

FIG. 5 depicts a flowchart of a process procedure for providing information regarding a condition recognition map from a vehicle in response to a request from a neighboring vehicle. This process procedure is started when, for example, the vehicle control system 100 controlling autonomous driving of the vehicle 220 that is traveling near the vehicle 200 in FIG. 2 receives a request from the vehicle 200 through V2V communication, and is executed at the autonomous driving control section 112.

The information request from a neighboring vehicle includes information regarding the current position of the neighboring vehicle (as previously explained). The condition recognition section 153 of the own vehicle compares information regarding an object being currently recognized in the surrounding area of the own vehicle with the current position of the information request source vehicle (step S501). Examples of the object here include a vehicle, a bicycle, a pedestrian, and a guard rail.

Next, the condition recognition section 153 checks whether or not there is any information indicating whether or not any object exists within a predetermined nearby range (e.g., within 300 meters) of the information request source vehicle (step S502). In other words, the condition recognition section 153 checks whether or not there is any object with which the information request source vehicle may possibly collide when evacuating to the road shoulder.

Here, in a case where there is information indicating whether or not any object exists within the predetermined nearby range of the information request source vehicle (Yes in step S502), the condition recognition section 153 of the own vehicle creates a grid map of the predetermined nearby range of the information request source vehicle (step S503) and transmits the grid map to the information request source vehicle (step S504). Then, this process is ended.

In a case where there is no information indicating whether or not any object exists within the predetermined nearby range of the information request source vehicle (No in step S502), transmission of a grid map from the own vehicle to the information request source vehicle is not conducted. Then, the present process is terminated. For example, in a case where the information request source vehicle is excessively far and is outside effective ranges of the on-vehicle sensors of the own vehicle, there is no information indicating whether or not any object exists within the predetermined nearby range of the information request source vehicle. It is to be noted that, in a case where the information request source vehicle fails to obtain information, it abandons evacuation to a road shoulder and stops in the present lane, but the risk of being run into from behind is low because it is predicted that there is few vehicles in the surrounding area.

C-2. Processes to be Executed when Dead Angles are Generated by Surrounding Walls This chapter gives an explanation about a process procedure for, when the visual field of a vehicle in autonomous driving is narrowed by a surrounding wall around an intersection, allowing the vehicle to pass through the intersection without reducing the speed, on the basis of information acquired from a neighboring vehicle.

Even when all the outside recognition sensors are normally operating, the visual field of the vehicle 300 is narrowed, at the intersection, by surrounding walls as depicted in FIG. 3, so that dead angles are generated on the left and right side of the intersection. Immediately before the intersection, the vehicle 300 needs to be prepared for sudden appearance of the bicycle 310 or the other vehicle 320. Hereinafter, it is assumed that the vehicle 300 passes through the intersection while avoiding a collision on the basis of information acquired from the vehicle 320 that is traveling toward the intersection from the left side.

When on-vehicle cameras 321 and 322 of the neighboring vehicle 320 are normally operating, dead angles to the vehicle 300 around the intersection can be complemented. Similarly, when the on-vehicle cameras 301 to 303 of the vehicle 300 are normally operating, dead angles to the vehicle 320 around the intersection can be complemented.

Figure 6:
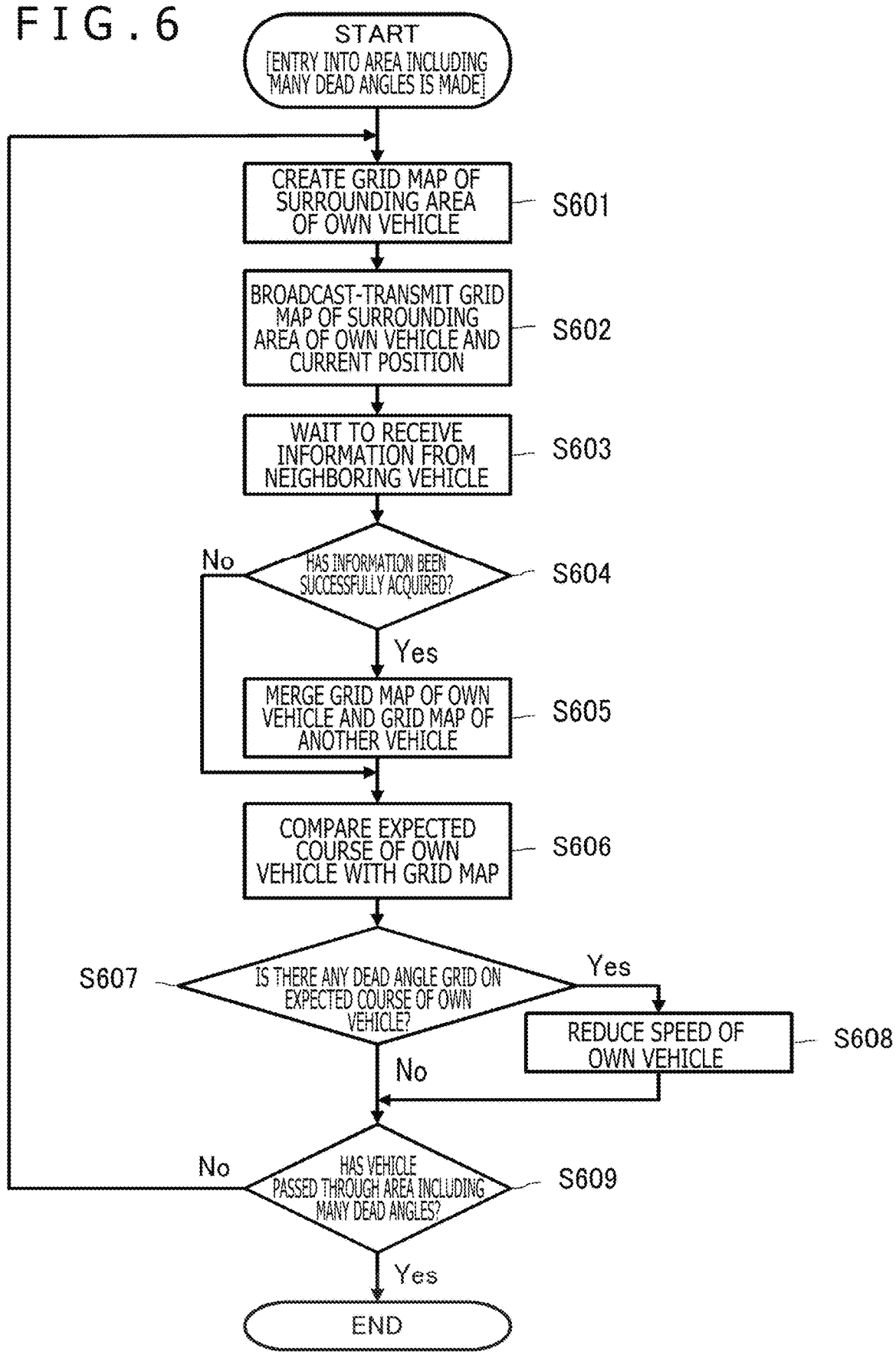
FIG. 6 is a flowchart depicting a process procedure to be executed when a vehicle enters an area including many dead angles.

FIG. 6 depicts a flowchart of a process procedure for allowing a vehicle in autonomous driving to pass through an intersection or the like while avoiding a collision with an object that suddenly appears from a dead angle when the visual field of the vehicle is narrowed by surrounding walls around the intersection. This process procedure is started when, for example, the map analysis section 151 in the vehicle control system 100 controlling autonomous driving of the vehicle 300 in FIG. 3 determines an entry into an area including many dead angles on the basis of analysis of map information, and is executed at the autonomous driving control section 112. In addition, it is assumed that the vehicle 320 traveling toward the intersection from the left side also executes similar processes in autonomous driving.

First, the condition recognition section 153 tries to create a condition recognition map of the surrounding area of the own vehicle on the basis of sensor information acquired from the on-vehicle sensors in the data acquisition section 102 (step S601). Here, as the condition recognition map, a grid map in which object existence probabilities in respective grids are indicated is created (as previously described). Since the visual field at an intersection is narrowed by surrounding walls, it is expected that the grid map includes dead angle grids.

Next, the autonomous driving control section 112 broadcast-transmits a request for information to complement the dead angle grids, via the communication section 103 (step S602).

This information request includes the grid map of the surrounding area of the own vehicle created in S601 and information regarding the current position of the own vehicle detected on the basis of a GNSS signal received at the data acquisition section 102. In addition, the communication section 103 broadcast-transmits the information request to neighboring vehicles by basically using V2V communication, but may transmit the information request also to devices (e.g., a pedestrian's terminal, a monitoring camera, and a fixed point camera in the surrounding area of the own vehicle, etc.), which are other than vehicles, by using V2X communication other than V2V. In addition, as the information to complement the dead angle grids, a grid map created in the similar manner in a neighboring vehicle is returned from the neighboring vehicle.

After transmitting the information request in the previous step S602, the autonomous driving control section 112 waits to receive information from a neighboring vehicle for a predetermined time period (e.g., three seconds) (step S603).

In a case where information to complement the dead angle grids has been successfully received from a neighboring vehicle within the predetermined time period (Yes in step S604), the condition recognition section 153 merges the grid map created, in step S401, on the basis of the sensor information of the own vehicle and the grid map received from the neighboring vehicle (step S605). As a result of this merging, the dead angle grids in the grid map of the own vehicle are expected to be complemented, or contraction of the dead angle grids and expansion of the non-dead angle grids are expected. In a case where information to complement the dead angle grids is not received from a neighboring vehicle within the predetermined time period (No in step S604), merging with a grid map of a neighboring vehicle is abandoned.

Thereafter, the route planning section 161 in the planning section 134 compares an expected course of the own vehicle with the grid map obtained by the merging in the previous step S605 (step S606) and checks whether or not a dead angle grid still remains around the expected course of the own vehicle (step S607).

In a case where a dead angle grid exists around the expected course of the own vehicle (Yes in step S607), the operation control section 135 reduces the speed of the own vehicle (step S608) in order to be prepared for sudden appearance of an object such as the bicycle 310 or the other vehicle 320 from the dead angle grid. In a case where no dead angle grid exists around the expected course of the own vehicle (No in step S607), the operation control section 135 performs vehicle control according to the route planned by the route planning section 161, without reducing the speed.

Until the own vehicle passes through the area including many dead angles (No in step S609), the process is returned to step S601, so that the autonomous driving control section 112 repeatedly executes the above steps. After the own vehicle passes through the area including many dead angles (Yes in step S609), the present process is terminated by the autonomous driving control section 112.

It is to be noted that, instead of the determination on whether or not the own vehicle has passed through the area including many dead angles, a determination on whether or not the proportion of dead angle grids in the grid map obtained by the merging in step S605 is equal to or less than a predetermined value may be made in step S609 to determine to terminate the present process, or to stop the information request to neighboring vehicles. The reason for this is that gathering information from neighboring vehicles is not necessarily repeated as long as the vehicle has obtained a grid map substantially including no dead angle.

C-3. Control of Information Request Based on Dead Angle Range

In each of the above-described chapters C-1 and C-2, the process procedure is surely started when a predetermined event, such as a failure in the outside recognition sensors mounted on the vehicle or an entry of the own vehicle into a predetermined area such as an intersection, occurs in the own vehicle, and an information request is issued to neighboring vehicles at least once. In addition, in the process procedure explained in the chapter C-1, an information request is issued to neighboring vehicles once only.

Therefore, this chapter introduces a process procedure for controlling an information request to neighboring vehicles on the basis of the proportion of dead angle grids in a grid map (i.e., the grid map quality).

Figure 11:
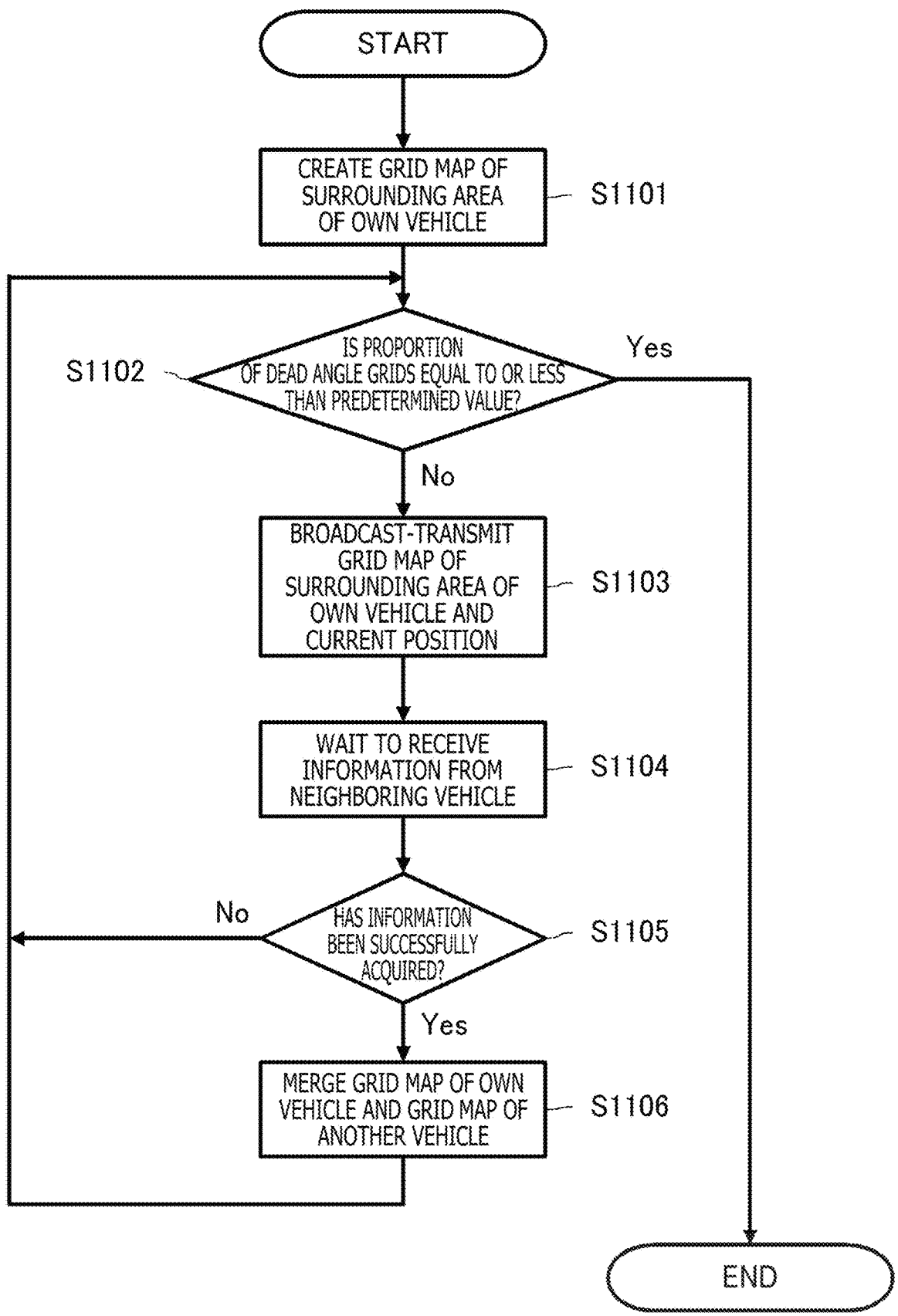
FIG. 11 is a flowchart depicting a process procedure for allowing a vehicle to create a grid map while performing quality management.

FIG. 11 depicts a flowchart of a process procedure for allowing a vehicle to create a grid map while performing quality management.

First, the condition recognition section 153 tries to create a condition recognition map of the surrounding area of the own vehicle on the basis of sensor information acquired by the on-vehicle sensors included in the data acquisition section 102 (step S601). Here, it is assumed that a grid map in which object existence probabilities in respective grids are indicated is created as the condition recognition map (as previously described).

Next, the condition recognition section 153 checks whether or not the proportion of dead angle grids in the currently held grid map is equal to or less than a predetermined value (step S1102).

In a case where the proportion of dead angle grids in the grid map is equal to or less than the predetermined value (Yes in step S1102), the condition recognition section 153 outputs the current grid map. Then, the present process is terminated. Thereafter, by using this grid map, the route planning section 161 plans a travel route of the own vehicle.

On the other hand, in a case where the proportion of dead angle grids in the grid map is greater than the predetermined value (No in step S1102), the quality of the grid map of the own vehicle is improved through merging of the grid map with a grid map created in a neighboring vehicle.

The autonomous driving control section 112 broadcast-transmits a request for information to complement the dead angle grids, via the communication section 103 (step S1103). This information request includes information regarding the current position of the own vehicle detected on the basis of a GNSS signal received at the data acquisition section 102 or the like. In addition, the communication section 103 may transmit an information request in which the grid map that is currently held in the own vehicle is included. Further, the communication section 103 broadcast-transmits the information request to neighboring vehicles by basically using V2V communication, but may transmit the information request also to devices (e.g., a pedestrian's terminal, a monitoring camera, and a fixed point camera in the surrounding area of the own vehicle, etc.), which are other than vehicles, by using V2X communication other than V2V.

After transmitting the information request in the previous step S1103, the autonomous driving control section 112 waits to receive information from a neighboring vehicle for a predetermined time period (e.g., three seconds) (step S1104).

In a case where information to complement the dead angle grids is successfully received from a neighboring vehicle within the predetermined time period (Yes in step S1105), the condition recognition section 153 merges the grid map currently held in the own vehicle and the grid map received from the neighboring vehicle (step S1106).

Thereafter, the process returns to step S1102 in which whether the proportion of dead angle grids in the grid map is equal to or less than the predetermined value is checked again (step S1102). In a case where the proportion of dead angle grids in the grid map is equal to or less than the predetermined value (Yes in step S1102), the condition recognition section 153 outputs the current grid map. Then, the present process is terminated.

On the other hand, in a case where the grid map quality is not ensured because the proportion of dead angle grids in the grid map is greater than the predetermined value (No in step S1102), the process proceeds to step S1103. Then, issuance of an information request to neighboring vehicles and merging of grid maps are repeatedly executed.

Also in a case where information to complement the dead angle grids is not received from a neighboring vehicle within the predetermined time period (No in step S1105) and the grid map quality cannot be improved through merging with a grid map created in a neighboring vehicle, the process is returned to step S1102. Then, issuance of an information request to neighboring vehicles and merging of grid maps are repeatedly executed.

C-4. Merging Grid Maps

This chapter gives an explanation about merging a grid map of the own vehicle and a grid map acquired from another vehicle, which is executed in step S407 in the flowchart depicted in FIG. 4 and step S605 in the flowchart depicted in FIG. 6.

The grid map is a map of the surrounding area of the own vehicle (or a predetermined target) and indicates the object existence probabilities in respective grids. Each grid is formed by a square having one side length of 25 centimeters, for example. However, the grid size is not limited to 25 centimeters. When the grid size is small, fine-grained map information the data amount of which is large is obtained. When the grid size is large, coarse-grained map information having a reduced data amount is obtained.

In addition, in the present embodiment, grids in which the respective object existence probabilities cannot be calculated because a failure has occurred in a sensor or the visual field of a sensor is blocked by an object such as a wall, are referred to as "dead angle grids," and the remaining grids are referred to as "non-dead angle grids" (as previously explained).

For example, when a dead angle flag is set for a grid, it can be discerned that the grid is a dead angle flag.

To create a grid map, the condition recognition section 153 sets dead angle flags for all the grids, and, when the object existence probability of a certain grid is calculated on the basis of sensor information from an outside recognition sensor, the condition recognition section 153 cancels the dead angle flag for the grid. Accordingly, it can be discerned that the grid is a non-dead angle grid.

Figure 7:
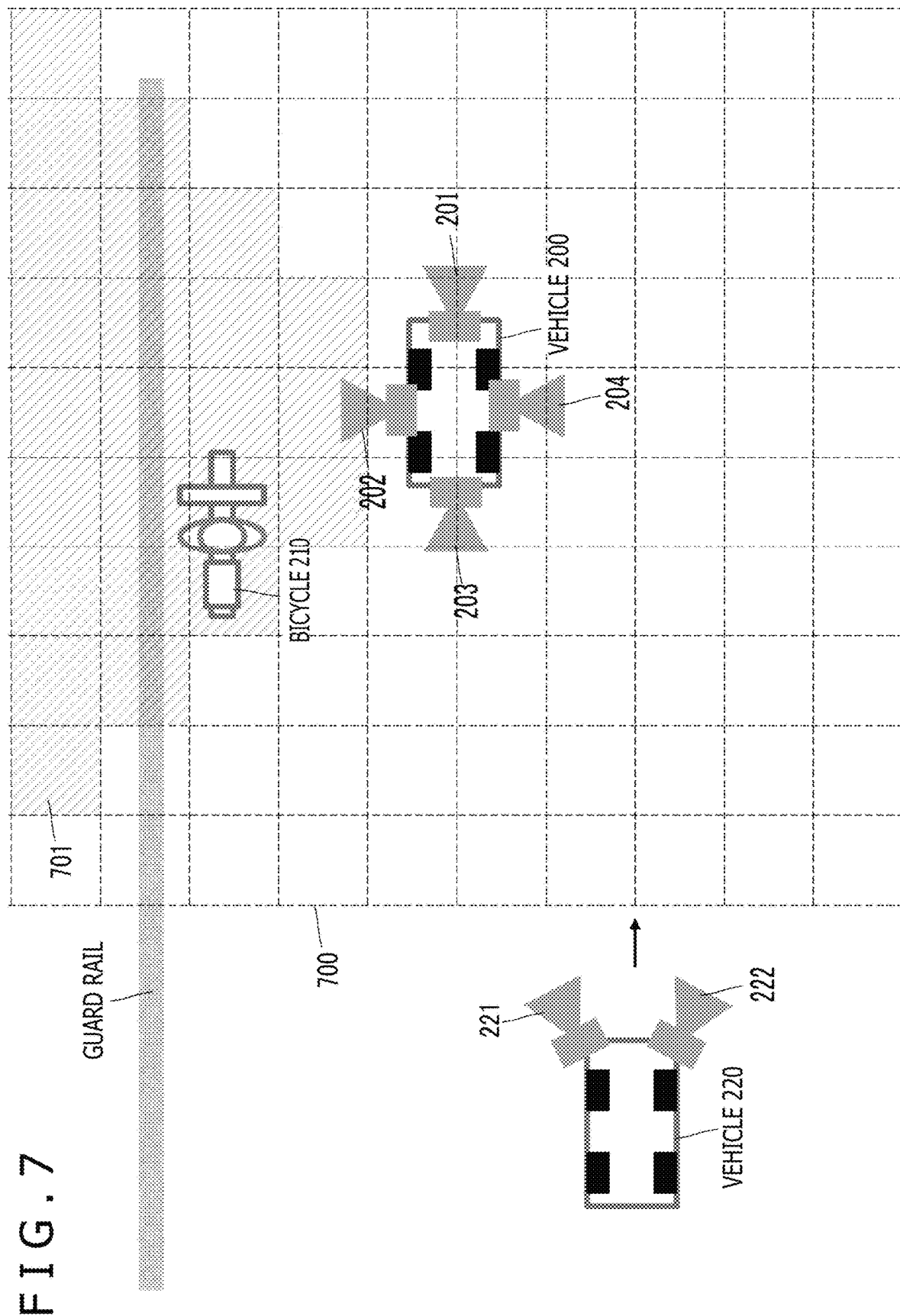
FIG. 7 is a diagram depicting a grid map example (example corresponding to FIG. 2).

FIG. 7 depicts a grid map 700 of the vehicle 200 in FIG. 2. In the figure, dead angle grids 701 that are generated on the left side of the vehicle 200 due to a failure in the on-vehicle camera 202 are hatched.

The vehicle 200 executes the process procedure depicted in FIG. 4, and the neighboring vehicle 220 executes the process procedure depicted in FIG. 5. Accordingly, the vehicle 200 can merge the grid map provided from the neighboring vehicle 220 with the grid map of the own vehicle, so that dead angle grids are complemented.

In the example depicted in FIG. 2, the neighboring vehicle 220 is behind the vehicle 200. A grid map created on the basis of an image captured by the on-vehicle camera 221 photographing the left front side of the neighboring vehicle 220 is merged with the grid map of the own vehicle. Accordingly, the dead angle grids 701 to the vehicle 200 can be complemented.

Figure 8:
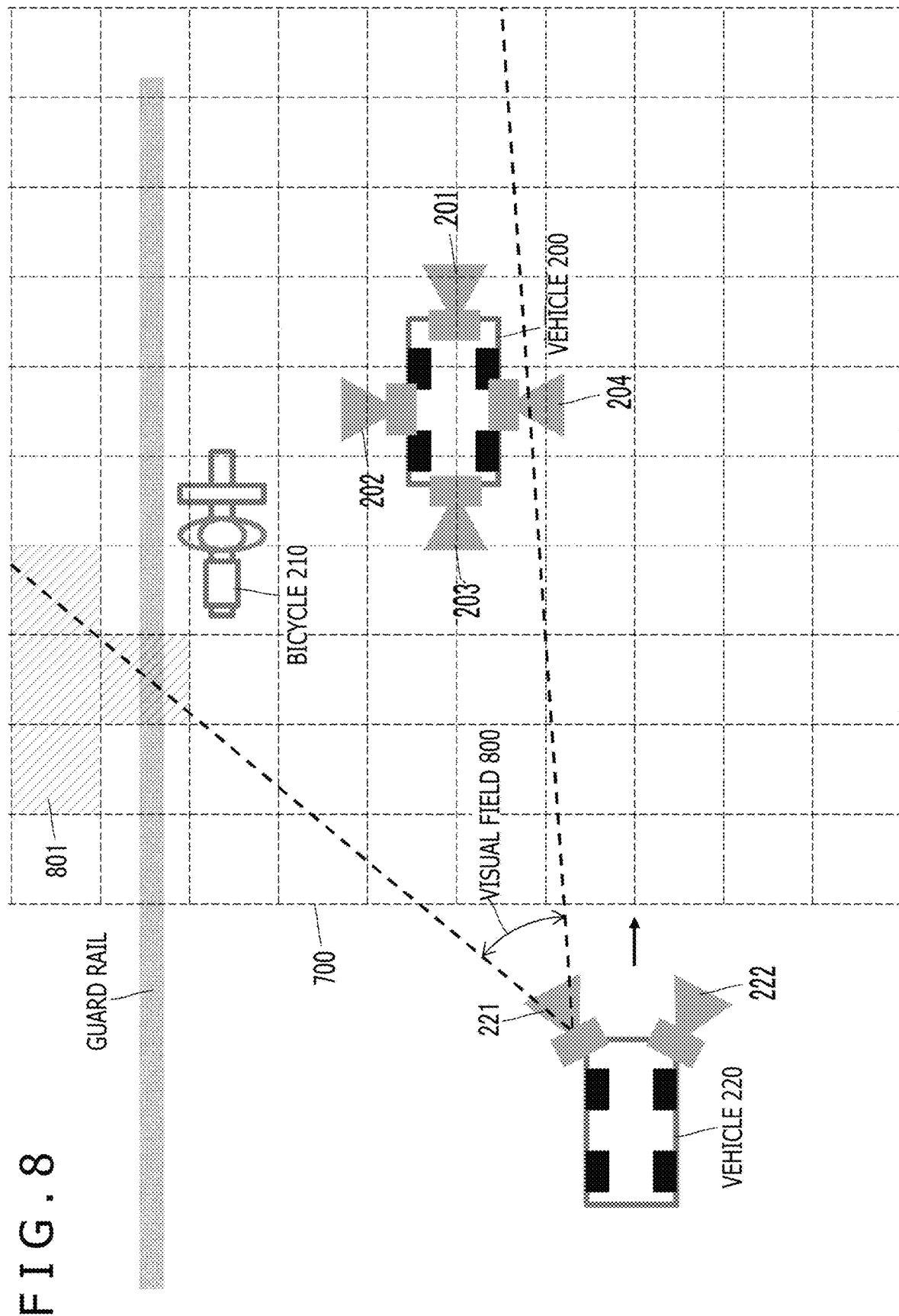
FIG. 8 is a diagram depicting an example in which a grid map of an own vehicle and a grid map of a neighboring vehicle are merged.

FIG. 8 depicts a result obtained by merging a grid map of the vehicle 200 with a grid map provided from the neighboring vehicle 220. From the vehicle 200 side, a grid map based on sensor information obtained within a visual field 800 of the on-vehicle camera 221 is provided. Therefore, merging the grid map of the vehicle 200 and the grid map of the neighboring vehicle 220 results in contraction of dead angle grids 801, as depicted in FIG. 8. Accordingly, the bicycle 210 can be fully detected. As a result, the vehicle 200 can generate a route to evacuate to a road shoulder while avoiding the bicycle 210.

Figure 9:
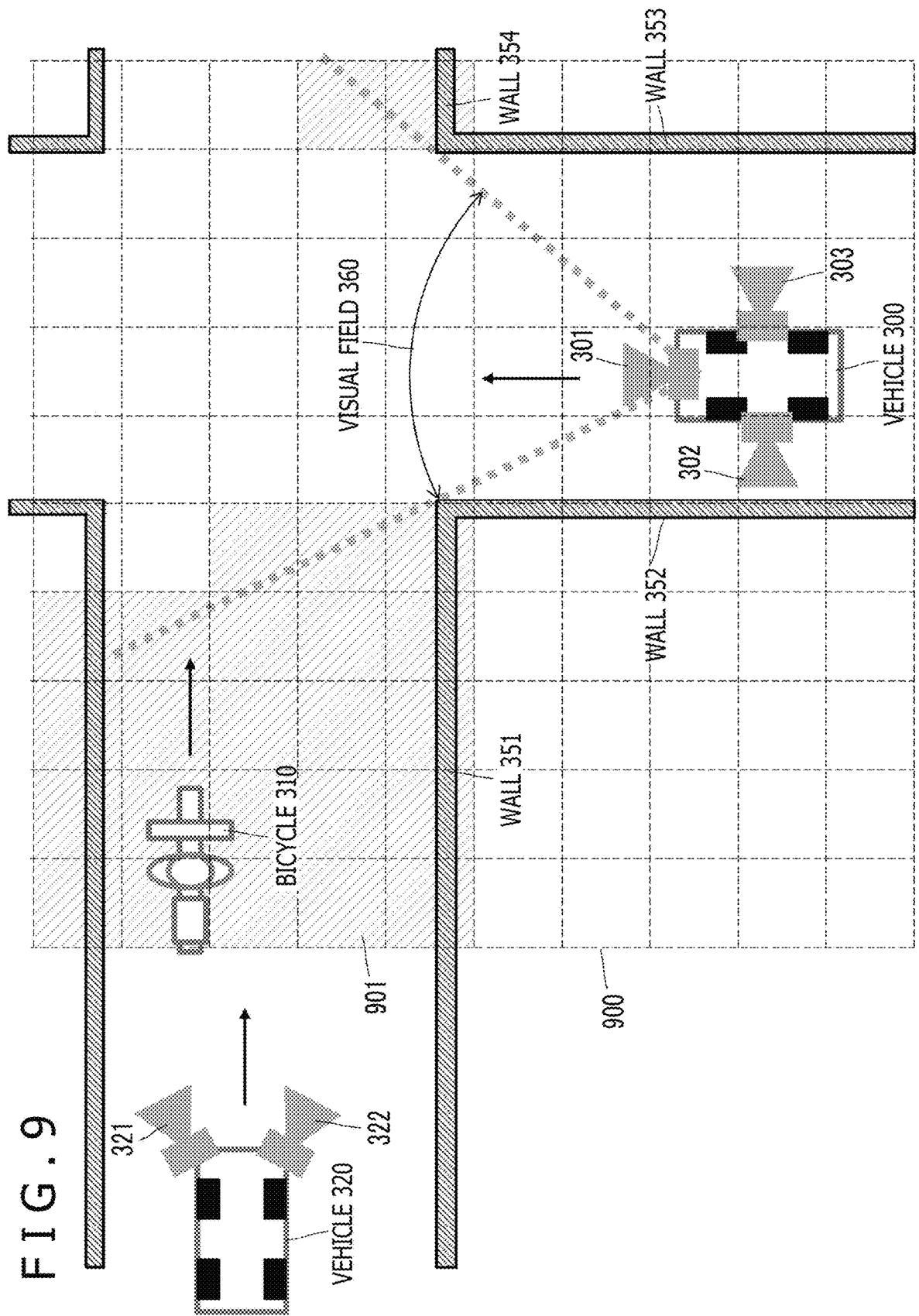
FIG. 9 is a diagram depicting a grid map example (example corresponding to FIG. 3).

FIG. 9 depicts a grid map 900 of the vehicle 300 in FIG. 3. In the figure, on the left front side and right front side of the vehicle 300, dead angle grids 901 that are generated because the visual fields of the cameras 301 to 303 are blocked by the surrounding walls 351 to 354 around the crossroad intersection, are hatched.

The vehicle 300 and the neighboring vehicle 320 each execute the process procedure depicted in FIG. 6. Accordingly, the vehicle 300 can complement the dead angle grids by merging a grid map provided from the neighboring vehicle 320 with the grid map of the own vehicle.

In the example depicted in FIG. 3, the neighboring vehicle 320 is traveling from the left side of the crossroad intersection, which is on the front side of the vehicle 300, toward the intersection. Therefore, the dead angle grids 901 to the vehicle 300 can be complemented through merging of a grid map created on the basis of images captured by the on-vehicle cameras 321 and 322 of the neighboring vehicle 320 with the grid map of the own vehicle.

Figure 10:
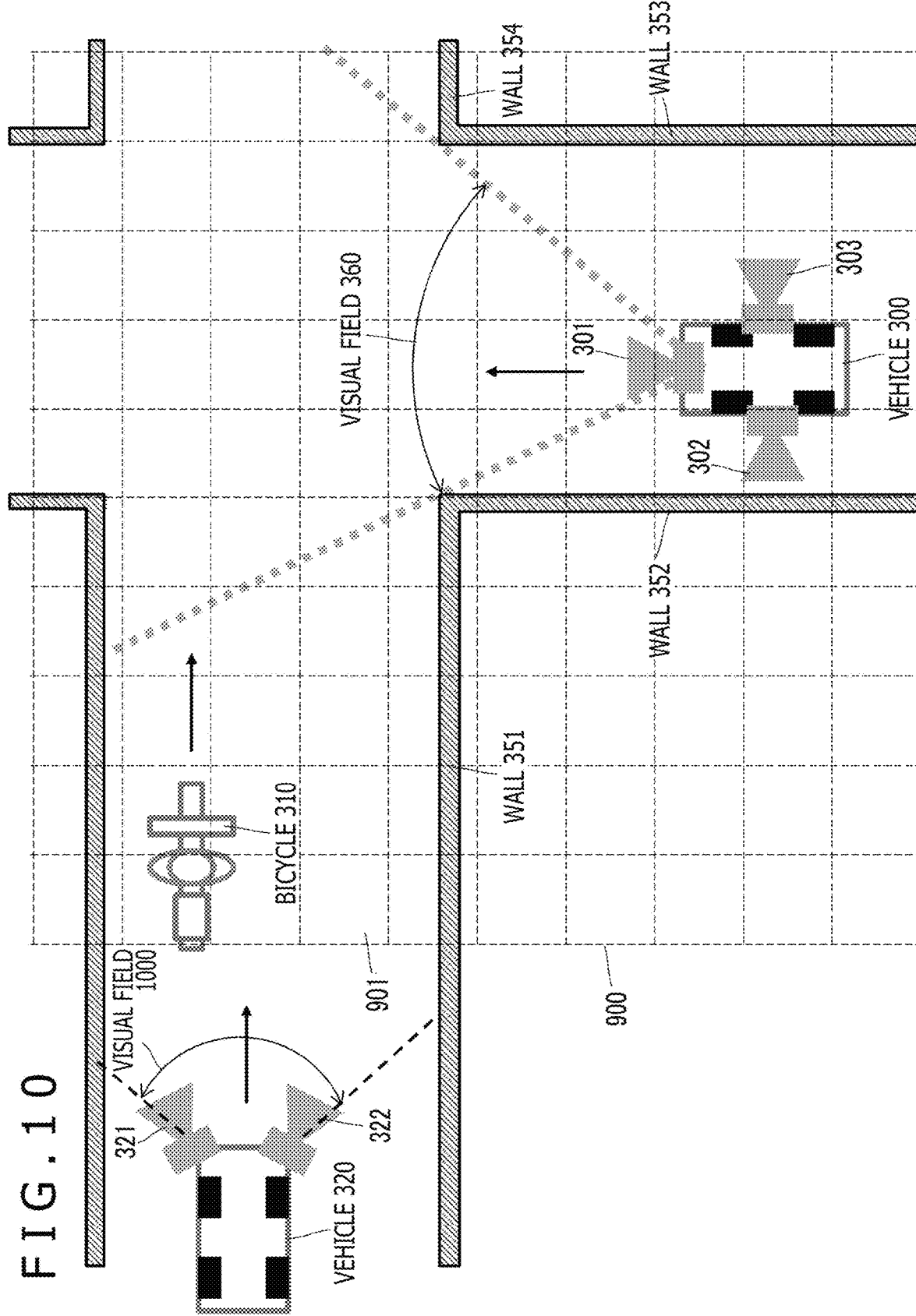
FIG. 10 is a diagram depicting an example in which a grid map of an own vehicle and a grid map of a neighboring vehicle are merged.

FIG. 10 depicts a result obtained by merging the grid map of the vehicle 300 with the grid map provided from the neighboring vehicle 320. From the vehicle 300 side, the grid map which is based on sensor information obtained within a visual field 1000 of the on-vehicle cameras 321 and 322 is provided. Therefore, merging the grid map of the vehicle 300 and the grid map of the neighboring vehicle 320 results in disappearance of the dead angle grids 901, as depicted in FIG. 10. Accordingly, the bicycle 310 can be fully detected. As a result, the vehicle 300 can generate a route to pass through the intersection while avoiding the bicycle 310 without reducing the speed.

INDUSTRIAL APPLICABILITY

The technology disclosed herein has been explained in detail so far with reference to the specific embodiments. However, it is obvious that a person skilled in the art can make modification or substitution on the embodiments within the gist of the technology disclosed herein.

The embodiments concerning grid maps generated on the basis of on-vehicle outside recognition sensors have been mainly explained herein. However, the applicable range of the technology disclosed herein is not limited to vehicles. For example, the technology disclosed herein is similarly applicable to other various types of mobile body apparatuses such as an unmanned aircraft (e.g., a drone), a robot that autonomously moves within a predetermined work place (e.g., a house, an office, a factory), a ship, and an aircraft. It goes without saying that the technology disclosed herein is similarly applicable to an information terminal mounted on a mobile body apparatus and various non-mobile type apparatuses.

A grid map that is generated on the basis of outside recognition sensors is not limited to a 2D map and may be a 3D map, for example. From a 3D grid map, not only a condition in a same plane but also a condition in a vertical direction (e.g., the condition of an obstacle approaching from above or below) can be recognized.

That is, the technology disclosed herein has been explained in the form of exemplifications, but the disclosure herein should not be limitedly interpreted. In order to assess the gist of the technology disclosed herein, the claims should be considered.

It is to be noted that the technology disclosed herein can have the following configurations.

(1) An information processing apparatus including:
- a creation section that creates a map of a surrounding area of a mobile body on the basis of sensor information acquired by one or more sensors mounted on the mobile body;
- a request section that issues an information request to an external apparatus on the basis of a state of the map created by the creation section; and
- a merge section that merges information acquired by the request section from the external apparatus with the created map.

(2) The information processing apparatus according to (1), in which
- the request section issues an information request to the external apparatus on the basis of a condition of a dead angle included in the map created by the creation section.

(3) The information processing apparatus according to (1), in which
- the request section issues an information request to the external apparatus on the basis of detection of a failure in the sensors.

(4) The information processing apparatus according to any one of (1) to (3), in which,
- in a case where autonomous driving of the mobile body according to the map created by the creation section cannot be continued, the request section issues an information request to the external apparatus.

(5) The information processing apparatus according to (4), in which,
- in a case where evacuation of the mobile body to a safe place is impossible due to a dead angle included in the map created by the creation section, the request section issues an information request to the external apparatus.

(6) The information processing apparatus according to (1) or (2), in which
- the request section issues an information request to the external apparatus on the basis of a result of comparison of information regarding a current position of the mobile body with map information.

(7) The information processing apparatus according to (6), in which,
- in a case where the map information indicates that many dead angles from the current position of the mobile body exist, the request section issues an information request to the external apparatus.

(8) The information processing apparatus according to any one of (1) to (7), in which
- the request section issues a request for map information to complement a dead angle included in the map created by the creation section or sensor information that is used to create a map to complement the dead angle, to the external apparatus.

(9) The information processing apparatus according to any one of (1) to (8), in which
- the request section controls issuance of an information request to the external apparatus, on the basis of a merging result obtained by the merge section.

(10) The information processing apparatus according to (9), in which
- the information acquired from the external apparatus is merged with the created map at the merge section, and the request section continues issuing a request to the external apparatus until dead angles included in the map become equal to or less than a predetermined value, or stops issuing a request to the external apparatus when dead angles included in the map become equal to or less than the predetermined value.

(11) The information processing apparatus according to any one of (1) to (10), in which
- the request section issues an information request to another mobile body.

(12) The information processing apparatus according to any one of (1) to (11), in which
- the mobile body includes a vehicle, and
- the request section issues an information request to another vehicle through vehicle-to-vehicle communication.

(13) The information processing apparatus according to any one of (1) to (12), further including:
- a control section that controls driving of the mobile body on the basis of the map created by the creation section or on the basis of a merging result obtained by the merge section.

(14) The information processing apparatus according to any one of (1) to (13), in which
- the map includes a grid map indicating object existence probabilities in respective grids, and
- the creation section, the request section, and the merge section perform information processing on the map for each grid.

(15) An information processing method including:
- a creation step of creating a map of a surrounding area of a mobile body on the basis of sensor information acquired by one or more sensors mounted on the mobile body;
- a request step of issuing an information request to the external apparatus on the basis of a state of the map created in the creation step; and
- a merging step of merging information acquired from the external apparatus in the request step with the created map.

(16) An information processing apparatus including:
- a creation section that creates a map of a surrounding area of a mobile body on the basis of sensor information acquired by one or more sensors mounted on the mobile body; and
- a providing section that provides at least partial information of the map created by the creation section, in response to a request from an external apparatus.

(17) The information processing apparatus according to (16), in which
- the providing section receives the request together with position information of the external apparatus and provides information of the map to the external apparatus that exists within a predetermined range from current position information of the mobile body.

(18) The information processing apparatus according to (16) or (17), in which
- the mobile body includes a vehicle, and
- the providing section provides information of the map to another vehicle through vehicle-to-vehicle communication.

(19) An information processing method including:
a creation step of creating a map of a surrounding area of a mobile body on the basis of sensor information acquired by one or more sensors mounted on the mobile body; and
a providing step of providing at least partial information of the map created by the creation section, in response to a request from an external apparatus.
(20) A mobile body apparatus including:
a mobile body main part;
one or more sensors mounted on the mobile body main part;
a creation section that creates a map of a surrounding area of the mobile body on the basis of sensor information acquired by the sensors sensors;
a request section that issues an information request to an external apparatus on the basis of a state of the map created by the creation section;
a merge section that merges information acquired by the request section from the external apparatus with the created map; and
a control section that controls driving of the mobile body main part on the basis of the map created by the creation section or on the basis of a merging result obtained by the merge section.

REFERENCE SIGNS LIST

100: Vehicle control system
101: Input section
102: Data acquisition section
103: Communication section
104: On-vehicle equipment
105: Output control section
106: Output section
107: Driving control section
108: Driving system
109: Body control section
110: Body system
111: Storage section
112: Autonomous driving control section
121: Communication network
131: Detection section
132: Own position estimation section
133: Condition analysis section
134: Planning section
135: Operation control section
141: Outside-vehicle information detection section
142: Inside-vehicle information detection section
143: Vehicle state detection section
151: Map analysis section
152: Traffic rule recognition section
153: Condition recognition section
154: Condition prediction section
161: Route planning section
162: Action planning section
163: Operation planning section
171: Emergency avoiding section
172: Acceleration/deceleration control section
173: Direction control section
200: Vehicle
201 to 204: On-vehicle camera
210: Bicycle
220: Neighboring vehicle
221, 222: On-vehicle camera
300: Vehicle
301 to 303: On-vehicle camera
310: Bicycle
320: Neighboring vehicle

The invention claimed is:

1. An information processing apparatus, comprising:
a creation section configured to create a map of a surrounding area of a first mobile body based on sensor information acquired by at least one sensor mounted on the first mobile body, wherein the map includes a first grid map indicating object existence probabilities in respective grids;
a request section configured to:
issue a first information request to an external apparatus based on a state of the map; and
acquire information from the external apparatus, wherein the acquired information is a second grid map;
a merge section configured to merge the first grid map with the second grid map; and
a control section configured to control driving of the first mobile body based on one of a merging result or the map created by the creation section, wherein the merging result is based on the merger of the first grid map with the second grid map.

2. The information processing apparatus according to claim 1, wherein the issuance of the first information request to the external apparatus is based on a condition of a dead angle included in the map.

3. The information processing apparatus according to claim 1, wherein the issuance of the first information request to the external apparatus is based on detection of a failure in the at least one sensor.

4. The information processing apparatus according to claim 1, wherein, in a case where autonomous driving of the first mobile body based on the map is discontinued, the request section is further configured to issue a second information request to the external apparatus.

5. The information processing apparatus according to claim 4, wherein, in a case where evacuation of the first mobile body to a safe place is impossible due to a dead angle included in the map created by the creation section, the request section is further configured to issue a third information request to the external apparatus.

6. The information processing apparatus according to claim 1, wherein the request section is further configured to issue a second information request to the external apparatus based on a result of comparison of information regarding a current position of the first mobile body with map information.

7. The information processing apparatus according to claim 6, wherein, in a case where the map information indicates that a plurality of dead angles from the current position of the first mobile body exists, the request section is further configured to issue a third information request to the external apparatus.

8. The information processing apparatus according to claim 1, wherein the request section is further configured to issue a request to the external apparatus for one of map information to complement a dead angle included in the map or sensor information that is used to create a specific map to complement the dead angle.

9. The information processing apparatus according to claim 1, wherein the request section is further configured to control issuance of a second information request to the external apparatus, based on the merging result.

10. The information processing apparatus according to claim 9, wherein
the information acquired from the external apparatus is merged with the map created at the merge section, and
the request section is further configured to continue issuance of a request to the external apparatus until dead angles included in the map become equal to or less than a specific value, or stop the issuance of the request to the external apparatus when the dead angles included in the map become equal to or less than the specific value.

11. The information processing apparatus according to claim 1, wherein the request section is further configured to issue a second information request to a second mobile body.

12. The information processing apparatus according to claim 1, wherein
the first mobile body includes a first vehicle, and
the request section is further configured to issue a second information request to a second vehicle through vehicle-to-vehicle communication.

13. The information processing apparatus according to claim 1, wherein
each of the creation section, the request section, and the merge section is further configured to perform information processing on the map for each grid.

14. An information processing method, comprising:
creating a map of a surrounding area of a mobile body based on sensor information acquired by at least one sensor mounted on the mobile body, wherein the map includes a first grid map indicating object existence probabilities in respective grids;
issuing an information request to an external apparatus based on a state of the map;
acquiring information from the external apparatus, wherein the acquired information is a second grid map;
merging the first grid map with the second grid map; and
controlling driving of the mobile body based on one of a merging result or the created map, wherein the merging result is based on the merger of the first grid map with the second grid map.

15. An information processing apparatus, comprising:
a creation section configured to create a map of a surrounding area of a first mobile body based on sensor information acquired by at least one sensor mounted on the first mobile body, wherein the map includes a grid map indicating object existence probabilities in respective grids; and
a providing section configured to provide at least partial information of the map created by the creation section, in response to a request from an external apparatus, wherein the external apparatus controls a second mobile body based on the at least partial information of the map created by the creation section.

16. The information processing apparatus according to claim 15, wherein the providing section is further configured to:
receive the request together with position information of the external apparatus, and
provide information of the map to the external apparatus that exists within a specific range from current position information of the first mobile body.

17. The information processing apparatus according to claim 15, wherein
the first mobile body includes a first vehicle, and
the providing section is further configured to provide information of the map to a second vehicle through vehicle-to-vehicle communication.

18. An information processing method, comprising:
creating a map of a surrounding area of a first mobile body based on sensor information acquired by at least one sensor mounted on the first mobile body, wherein the map includes a grid map indicating object existence probabilities in respective grids; and
providing, by a request section, at least partial information of the created map, in response to a request from an external apparatus, wherein the external apparatus controls a second mobile body based on the at least partial information of the map created.

19. A mobile body apparatus, comprising:
a mobile body comprising a mobile body main part;
at least one sensor mounted on the mobile body main part;
a creation section configured to create a map of a surrounding area of the mobile body based on sensor information acquired by the at least one sensor, wherein the map includes a first grid map indicating object existence probabilities in respective grids;
a request section configured to:
issue information request to an external apparatus based on a state of the map; and
acquire information from the external apparatus, wherein the acquired information is a second grid map;
a merge section configured to merge the first grid map with the second grid map; and
a control section configured to control driving of the mobile body main part based on one of a merging result or the map created by the creation section, wherein the merging result is based on the merger of the first grid map with the second grid map.

* * * * *